United States Patent
Zhou et al.

(10) Patent No.: US 11,052,381 B2
(45) Date of Patent: *Jul. 6, 2021

(54) MODIFIED Y-TYPE MOLECULAR SIEVE, PREPARATION THEREOF AND CATALYST COMPRISING THE SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Lingping Zhou, Beijing (CN); Weilin Zhang, Beijing (CN); Mingde Xu, Beijing (CN); Zhenyu Chen, Beijing (CN); Huiping Tian, Beijing (CN); Yuxia Zhu, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 47 days.

This patent is subject to a terminal disclaimer.

(21) Appl. No.: 16/484,063

(22) PCT Filed: Feb. 12, 2018

(86) PCT No.: PCT/CN2018/076428
§ 371 (c)(1),
(2) Date: Aug. 6, 2019

(87) PCT Pub. No.: WO2018/153301
PCT Pub. Date: Aug. 30, 2018

(65) Prior Publication Data
US 2020/0009541 A1    Jan. 9, 2020

(30) Foreign Application Priority Data

Feb. 21, 2017 (CN) .......................... 201710093973.8
Feb. 21, 2017 (CN) .......................... 201710093974.2
(Continued)

(51) Int. Cl.
*C01B 39/24* (2006.01)
*B01J 29/08* (2006.01)
(Continued)

(52) U.S. Cl.
CPC ............. *B01J 29/088* (2013.01); *B01J 21/04* (2013.01); *B01J 29/85* (2013.01); *B01J 35/1038* (2013.01);
(Continued)

(58) Field of Classification Search
CPC .. C01B 39/24; C01P 2006/14; C01P 2004/17; C01P 2004/37; B01J 29/088;
(Continued)

(56) References Cited

U.S. PATENT DOCUMENTS 4,840,047 A * 6/1989 Richter ..................... D21F 1/66
                                                         68/181 R
5,069,890 A   12/1991 Dai et al.
(Continued)

FOREIGN PATENT DOCUMENTS

CN       1031030 A    2/1989
CN       1088247 A    6/1994
(Continued)

OTHER PUBLICATIONS

Jianhui Zhao et al., "Study on Chemical Modification of Ultra-stable Y Molecular Sieve", QILU Petrochemical Technology, 2000, vol. 28, No. 1, pp. 36-39.
(Continued)

*Primary Examiner* — David M Brunsman
(74) *Attorney, Agent, or Firm* — Novick, Kim & Lee, PLLC; Allen Xue

(57) ABSTRACT

A modified Y-type molecular sieve has a rare earth oxide content of about 4% to about 12% by weight, a phosphorus
(Continued)

Dual probable pore size distribution of the
molecular sieve
according to the present application content of about 0% to about 10% by weight, a sodium oxide content of no more than about 1.0% by weight, a total pore volume of about 0.36 to 0.48 mL/g, a percentage of the pore volume of secondary pores to the total pore volume of about 20% to about 40%, a lattice constant of about 2.440 nm to about 2.455 nm, a percentage of the non-framework aluminum content to the total aluminum content of no more than about 10%, a lattice collapse temperature of not lower than about 1060° C., and a ratio of Brønsted acid to Lewis acid of no less than about 3.50. The preparation of the molecular sieve includes ion-exchange with rare earth, hydrothermal roasting, gas phase ultra-stabilization, acid treatment, and an optional phosphorus modification.

20 Claims, 1 Drawing Sheet

(30) Foreign Application Priority Data

Feb. 21, 2017 (CN) .......................... 201710093975.7
Feb. 21, 2017 (CN) .......................... 201710093980.8

(51) Int. Cl.
    *B01J 29/85*     (2006.01)
    *C10G 11/05*     (2006.01)
    *B01J 21/04*     (2006.01)
    *B01J 35/10*     (2006.01)
    *B01J 37/06*     (2006.01)
    *B01J 37/10*     (2006.01)
    *B01J 37/28*     (2006.01)
    *B01J 37/30*     (2006.01)

(52) U.S. Cl.
CPC ....... *B01J 35/1042* (2013.01); *B01J 35/1061* (2013.01); *B01J 35/1066* (2013.01); *B01J 37/06* (2013.01); *B01J 37/10* (2013.01); *B01J 37/28* (2013.01); *B01J 37/30* (2013.01); *C01B 39/24* (2013.01); *C10G 11/05* (2013.01); *B01J 2229/16* (2013.01); *B01J 2229/183* (2013.01); *B01J 2229/186* (2013.01); *B01J 2229/32* (2013.01); *B01J 2229/36* (2013.01); *B01J 2229/37* (2013.01); *B01J 2229/42* (2013.01); *C01P 2006/14* (2013.01); *C01P 2006/17* (2013.01); *C01P 2006/37* (2013.01); *C10G 2300/206* (2013.01); *C10G 2300/301* (2013.01); *C10G 2300/302* (2013.01); *C10G 2300/308* (2013.01); *C10G 2300/70* (2013.01); *C10G 2400/02* (2013.01); *C10G 2400/04* (2013.01)

(58) Field of Classification Search
CPC .. B01J 35/042; B01J 35/1038; B01J 2229/32; B01J 2229/36; B01J 2229/42; B01J 35/1042; B01J 29/85; B01J 35/1061; B01J 35/1066; B01J 37/30; C10G 11/05
See application file for complete search history.

(56) References Cited

U.S. PATENT DOCUMENTS

| | | | |
|---|---|---|---|
| 5,087,348 A | | 2/1992 | Dai et al. |
| 5,601,798 A | | 2/1997 | Cooper et al. |
| 9,840,422 B2 | * | 12/2017 | Gao ........................ B01J 29/084 |
| 9,993,811 B2 | * | 6/2018 | Zhou ........................ B01J 8/002 |
| 2013/0131419 A1 | | 5/2013 | Buchanan et al. |
| 2014/0299511 A1 | | 10/2014 | Luo et al. |
| 2015/0151284 A1 | | 6/2015 | Gao et al. |

FOREIGN PATENT DOCUMENTS

| | | |
|---|---|---|
| CN | 1098130 A | 2/1995 |
| CN | 1127161 A | 7/1996 |
| CN | 1194941 A | 10/1998 |
| CN | 1317547 A | 10/2001 |
| CN | 1330981 A | 1/2002 |
| CN | 1353086 A | 6/2002 |
| CN | 1362472 A | 8/2002 |
| CN | 1382631 A | 12/2002 |
| CN | 1382768 A | 12/2002 |
| CN | 1388064 A | 1/2003 |
| CN | 1436727 A | 8/2003 |
| CN | 1506161 A | 6/2004 |
| CN | 1629258 A | 6/2005 |
| CN | 1916116 A | 2/2007 |
| CN | 101081369 A | 12/2007 |
| CN | 101285001 A | 10/2008 |
| CN | 101450320 A | 6/2009 |
| CN | 101745418 A | 6/2010 |
| CN | 101767029 A | 7/2010 |
| CN | 102020289 A | 4/2011 |
| CN | 103159227 A | 6/2013 |
| CN | 103787352 A | 5/2014 |
| CN | 104229823 A | 12/2014 |
| CN | 104556132 A | 4/2015 |

OTHER PUBLICATIONS

Cuiding Yang, "Petrochemical Analysis Methods (RIPP Test Methods)", Science Press, Sep. 1990, First Edition, pp. 263-268, 412-415 and 424-426, ISBN: 7-03-001894-X.

* cited by examiner

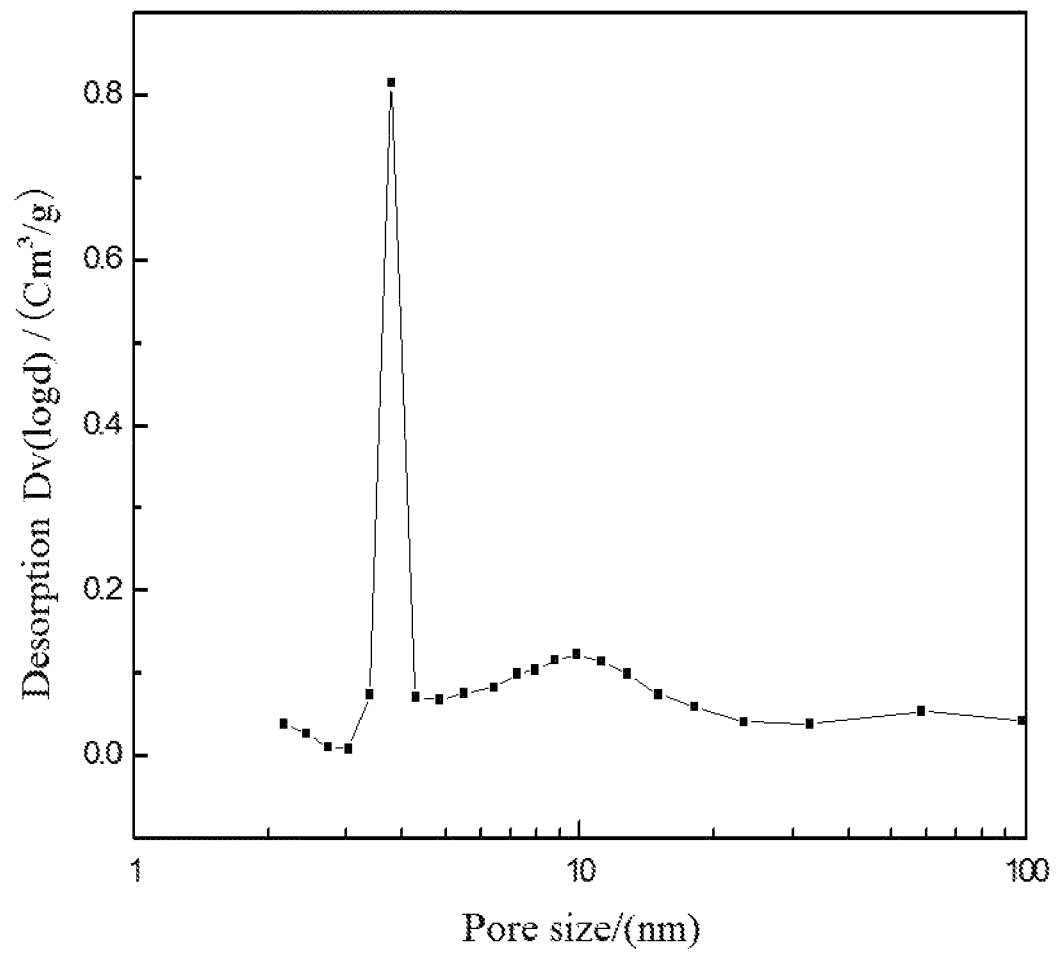
Dual probable pore size distribution of the molecular sieve according to the present application

US 11,052,381 B2

MODIFIED Y-TYPE MOLECULAR SIEVE, PREPARATION THEREOF AND CATALYST COMPRISING THE SAME

This application is a national stage 371 filing of PCT/CN2018/076428, filed Feb. 12, 2018

TECHNICAL FIELD

The present application relates to a modified Y-type molecular sieve, preparation thereof and a catalyst comprising the same, and more particularly to a highly stable modified Y-type molecular sieve for catalytic cracking of hydrocarbon oils, preparation thereof and a catalytic cracking catalyst comprising the same.

BACKGROUND ART

Since its first use in the 1960s, Y-type molecular sieves have been the main active component of fluid catalytic cracking (FCC) catalysts. However, as crude oils become heavier, the content of polycyclic compounds in FCC feedstocks increases significantly, while their ability to diffuse in the pores of molecular sieves decreases significantly. When catalysts comprising Y-type molecular sieves as the main active component are directly used to process heavy fractions such as residual oils, the accessibility of the active center of the catalysts will become a major obstacle to the cracking of polycyclic compounds contained therein, since Y-type molecular sieves used as the main active component have a pore size of only 0.74 nm.

The pore structure of molecular sieves is closely related to the cracking performance, especially for residue cracking catalysts. Secondary pores of molecular sieves can increase the accessibility of macromolecules of residual oils to the active center of catalysts, thereby improving their cracking capability for residual oils. Hydrothermal dealuminization method is one of the most widely used methods for preparing ultra-stable molecular sieves in the industry. The method comprises firstly subjecting a NaY molecular sieve to ion-exchange with an aqueous solution containing ammonium ions to reduce the content of sodium ion in the molecular sieve, and then subjecting the ammonium ion-exchanged molecular sieve to roasting at 600-825° C. in steam atmosphere to allow it to be ultra-stabilized. The method is cost-effective and is easy to be industrialized for large-scale production, and the ultra-stable Y-type molecular sieve thus obtained is rich in secondary pores, but there is a serious loss in the crystallinity of the molecular sieve and the thermal stability thereof is poor.

At present, the production for ultra-stable Y-type molecular sieves used in the industry is normally based on an improvement on the above-mentioned hydrothermal roasting method. A method comprising two ion-exchange stages and two roasting stages can be adopted, and the ultra-stable Y molecular sieve obtained thereby may also have a certain amount of secondary pores. However, the proportion of secondary pores having a relatively large pore size in the total secondary pores is low, and the specific surface area and crystallinity of the ultra-stable molecular sieves need to be further improved.

U.S. Pat. Nos. 5,069,890 and 5,087,348 disclose a method for the preparation of mesoporous Y-type molecular sieves, comprising the step of subjecting a commercially available USY raw material to a treatment at 760° C. in 100% steam atmosphere for 24 hours. The mesopore volume of the Y-type molecular sieve obtained by this method is increased from 0.02 mL/g to 0.14 mL/g, but its crystallinity is decreased from 100% to 70%, its specific surface area is decreased from 683 m²/g to 456 m²/g, and its acid density is dropped dramatically from 28.9% to 6%.

U.S. Pat. No. 5,601,798 discloses a method for the preparation of mesoporous Y-type molecular sieves, comprising the steps of mixing HY or USY raw material in an autoclave with a $NH_4NO_3$ solution or a mixed solution of $NH_4NO_3$ and $HNO_3$, and subjecting the mixture to a treatment at a temperature of 115-250° C. above its boiling point for 2-20 hours. The mesoporous molecular sieve thus obtained may have a mesopore volume of up to 0.2-0.6 mL/g, but its crystallinity and specific surface area are significantly decreased.

CN104229823A discloses a method for the combined modification of mesoporous ultra-stable Y molecular sieves, which is characterized in that an organic acid dealuminating agent and an inorganic salt dealuminating agent are simultaneously added during the modification to conduct a combined organic acid-inorganic salt modification. The optimum operation conditions such as optimum concentrations of the organic acid and inorganic salt solutions, volume ratio, reaction time and reaction temperature can be determined by orthogonal test. The USY molecular sieve obtained by this method shows a significantly increased secondary pore content than the industrial USY molecular sieve, and is suitable for as a support in hydrocracking catalysts for producing more middle distillate. CN1388064A discloses a method for the preparation of high-silica Y-type zeolites having a lattice constant of 2.420-2.440 nm, comprising the steps of subjecting a NaY zeolite or an ultra-stabilized Y-type zeolite to one or more stages of ammonium exchange, hydrothermal treatment and/or chemical dealumination, characterized in that at least the first ammonium exchange stage prior to the hydrothermal treatment and/or chemical dealumination of the ammonium exchange stage (s) is a low-temperature selective ammonium exchange conducted at a temperature of from room temperature to below 60° C., and other ammonium exchange stage(s) is either a low-temperature selective ammonium exchange conducted at a temperature of from room temperature to below 60° C. or a conventional ammonium exchange conducted at 60-90° C. The high-silica Y-type zeolite obtained in this patent application shows a high retention of crystallinity at a small lattice constant and has more secondary pores, and is suitable for middle distillate hydrocracking catalysts. The ultra-stable Y molecular sieves prepared by the methods disclosed in the above documents comprise a certain amount of secondary pores, have a small lattice constant and a relatively high silica-alumina ratio, and contain no rare earth. They are suitable for hydrogenation catalysts, but are difficult to satisfy the high catalystic cracking activity required for the processing of heavy oils.

CN1629258A discloses a method for the preparation of a cracking catalyst containing a rare earth modified ultra-stable Y-type molecular sieve, comprising the steps of contacting a NaY molecular sieve with an aqueous ammonium salt solution containing 6-94% by weight of the ammonium salt under atmospheric pressure at a temperature of from greater than 90° C. to no more than the boiling point of the aqueous ammonium salt solution at a weight ratio of the ammonium salt to the molecular sieve ranging from 0.1-24 for two or more times to reduce the $Na_2O$ content of the molecular sieve to less than 1.5% by weight; contacting the treated molecular sieve with an aqueous solution having a rare earth salt concentration of 2-10% by weight at 70-95° C. to obtain a modified molecular sieve comprising 0.5-18% by weight of the rare earth, calculated based on $RE_2O_3$, and then mixing the modified molecular sieve with a support and drying. The molecular sieve thus obtained is not sufficiently ultra-stablized, and has a relatively low silica-alumina ratio, and less secondary pores.

CN1127161A discloses a method for the preparation of a rare earth modified silica-rich ultra-stable Y-type molecular sieve, in which NaY is used as a feedstock, and a gas phase Si—Al isomorphous substitution reaction is carried out with $SiCl_4$ in the presence of solid $RECl_3$ to complete the ultra-stabilization and the rare earth ion-exchange of the NaY in a single step. The molecular sieve obtained by the method has a lattice constant $a_0$ of 2.430-2.460 nm, a rare earth content of 0.15-10.0% by weight, and a $Na_2O$ content of less than 1.0% by weight. However, the molecular sieve is prepared by using only the gas phase ultra-stabilization method, and thus, though an ultra-stable Y molecular sieve containing rare earth can be obtained, the molecular sieve obtained lacks secondary pores.

In gas phase chemical methods, an isomorphous substitution reaction occurs under gas phase ultra-stabilization conditions, where the aluminum in the framework of the molecular sieve is directly substituted by the silicon in the gaseous silicon tetrachloride, so that the aluminium removal and silicon supplementation are carried out simultaneously, and a uniform dealumination can be achieved. However, gas phase ultra-stabilized molecular sieves have no secondary pores.

CN1031030A discloses a method for the preparation of ultra-stable Y-type molecular sieves with low rare earth content, in which an ultra-stable Y-type molecular sieve with low rare earth content for the cracking of hydrocarbons is prepared by the step of subjecting a NaY-type molecular sieve raw material to a single stage of combined ion-exchange with ammonium and rare earth ions, and then to stabilization treatment, partial removal of framework aluminum atoms, thermal or hydrothermal treatment, and the like. The molecular sieve has a rare earth content ($RE_2O_3$) of 0.5-6 wt %, a $SiO_2/Al_2O_3$ ratio of 9-50, and a lattice constant $a_0$ of 2.425-2.440 nm. The ultra-stable molecular sieve obtained by the method has a high silica-alumina ratio and a small lattice constant, and contains a certain amount of rare earth. However, the molecular sieve obtained shows a poor catalytic cracking activity for heavy oils and a poor coke selectivity.

CN1330981A discloses a phosphorus-modified Y-type zeolite and preparation thereof, in which the phosphorus-modified Y-type zeolite comprises phosphorus, a silicon component and a rare earth component, and the silicon component is supported by impregnating the zeolite with a solution of a silicon compound, the silicon component is present in an amount of 1 to 15% by weight calculated on the basis of $SiO_2$, the phosphorus component is present in amount of 0.1 to 15% by weight calculated on the basis of $P_2O_5$, and the rare earth component is present in an amount of 0.2 to 15% by weight calculated on the basis of rare earth oxides. The molecular sieve is prepared by impregnating a rare earth-containing Y-type zeolite with a solution containing silicon and phosphorus, drying, and then subjecting the resultant to hydrothermal roasting at 550-850° C. However, the phosphorus-modified Y-type zeolite shows a low cracking activity for heavy oils, and a low yield of light oil.

CN1353086A discloses a method for the preparation of Y-type molecular sieves containing phosphorus and rare earth, comprising the steps of subjecting a NaY molecular sieve to combined ion-exchange with ammonium and rare earth ions and hydrothermal roasting, then reacting with a phosphorus compound to incorporate thereinto 0.2-10% by weight of phosphorus (calculated on the basis of $P_2O_5$), and subjecting the resultant to hydrothermal roasting again. However, the phosphorus-containing Y-type zeolite shows a low cracking activity for heavy oils, and a low yield of light oil.

CN1506161A discloses a rare earth modified ultra-stable Y molecular sieve active component, which comprises 8-25% by weight of rare earth oxides, 0.1-3.0% by weight of phosphorus, and 0.3-2.5% by weight of sodium oxide, and has a crystallinity of 30-55% and a lattice constant of 2.455-2.472 nm. To obtain the molecular sieve, a NaY zeolite raw material is subjected to ion-exchange with rare earth and to a first roasting to produce an "one-time ion exchange and one-time roasting" rare earth modified NaY zeolite, and then reacted with rare earth, a phosphorus-containing material and an ammonium salt, and subjected to a second roasting to produce a phosphorus and rare earth modified Y zeolite. The molecular sieve thus obtained has a high rare earth content, a large lattice constant, a poor thermal stability, and a poor coke selectivity.

CN1317547A discloses a phosphorus and rare earth modified Y-type zeolite and preparation thereof, the molecular sieve being obtained by subjecting a NaY zeolite to combined ion-exchange with rare earth and ammonium salt, hydrothermal roasting, reaction with a phosphorus compound, and then to a second roasting, in which the weight ratio of $RE_2O_3$/Y zeolite is 0.02-0.18, the weight ratio of ammonium salt/Y zeolite is 0.1-1.0, the weight ratio of P/Y zeolite is 0.003-0.05, the roasting temperature is 250-750° C., the atmosphere is 5-100% steam atmosphere, and the time is 0.2-3.5 hours. The modified Y-type zeolite thus obtained shows a poor thermal stability and a low cracking activity for heavy oils.

CN1436727A provides a method for the preparation of "one-time ion exchange and one-time roasting" modified faujasite zeolites, comprising the steps of subjecting a faujasite zeolite to one stage of ion-exchange with a phosphorus compound and an ammonium compound, and subjecting the ion-exchanged slurry to a further reaction by introducing thereinto a rare earth solution, and then to filtering, washing, and roasting in steam atmosphere. The zeolite thus obtained shows a low cracking activity and a low heavy oil conversion.

In addition, the liquid phase Si—Al isomorphous substitution method using $(NH_4)_2SiF_6$ is also a common used method for the preparation of ultra-stable molecular sieves, of which the mechanism is to replace the Al atoms in the framework of the molecular sieve with Si in the $(NH_4)_2SiF_6$ in solution, so that an ultra-stable molecular sieve with an increased silica-alumina ratio can be produced. The Si—Al isomorphous substitution method using $(NH_4)_2SiF_6$ is characterized in that an ultra-stable zeolite with a framework $SiO_2/Al_2O_3$ molar ratio of 10-30 or higher can be produced, which has a high thermal stability, no non-framework aluminum or $Al_2O_3$ fragments, and a high relative crystallinity. However, due to the diffusion problem, the dealumination with $(NH_4)_2SiF_6$ is nonuniform and may cause a deficiency of surface Al, which is called "surface enrichment of silicon". In addition, the insoluble substance $AlF_3$ generated during the dealumination with $(NH_4)_2SiF_6$ and the residual fluorosilicate may affect the hydrothermal stability of the molecular sieve, $(NH_4)_2SiF_6$ may cause an environmental pollution, and the ultra-stable molecular sieve obtained lacks secondary pores.

SUMMARY OF THE INVENTION

It is an object of the present application to provide a highly stable modified Y-type molecular sieve suitable for catalytic cracking processing of heavy oils, preparation thereof and a catalyst comprising the same. The modified Y-type molecular sieve and the catalyst comprising the same show a higher cracking activity for heavy oils and a better coke selectivity.

In an aspect, the present application provides a modified Y-type molecular sieve having a rare earth oxide content of about 4% to about 12% by weight, a phosphorus content of about 0% to about 10% by weight on the basis of $P_2O_5$, a sodium oxide content ($Na_2O$ content) of no more than about 1.0% by weight, a total pore volume of about 0.36 mL/g to about 0.48 mL/g, a percentage of the pore volume of secondary pores having a pore size of 2-100 nm to the total pore volume of the modified Y-type molecular sieve of about 20% to about 40%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

In another aspect, the present application provides a method for the preparation of a modified Y-type molecular sieve, comprising the steps of:

(1) contacting a NaY molecular sieve with a rare earth salt solution for ion-exchange reaction, to obtain a rare earth modified Y-type molecular sieve having a reduced sodium oxide content;

(2) subjecting the Y-type molecular sieve obtained in the step (1) to roasting at a temperature of about 350° C. to about 520° C. in an atmosphere containing about 30 vol % to about 90 vol % of steam for about 4.5 hours to about 7 hours, to obtain a Y-type molecular sieve having a reduced lattice constant;

(3) contacting and reacting the Y-type molecular sieve obtained in the step (2) with gaseous silicon tetrachloride at a weight ratio of $SiCl_4$ to the Y-type molecular sieve on a dry basis ranging from about 0.1:1 to about 0.7:1 and a reaction temperature of about 200° C. to 650° C. for a reaction time of about 10 minutes to about 5 hours, to obtain a gas phase ultra-stabilized Y-type molecular sieve;

(4) contacting the modified Y-type molecular sieve obtained in the step (3) with an acid solution; and (5) optionally, subjecting the acid-treated modified Y-type molecular sieve obtained in the step (4) to phosphorus modification by contacting with a phosphorus compound.

In a further aspect, the present application provides a catalytic cracking catalyst comprising a modified Y-type molecular sieve according to the present application or a modified Y-type molecular sieve obtained by the method according to the present application.

In a preferred embodiment, the catalytic cracking catalyst comprises about 10% to about 50% by weight, on a dry basis, of the modified Y-type molecular sieve, about 10% to about 40% by weight of an alumina binder calculated on the basis of alumina, and about 10% to about 80% by weight, on a dry basis, of the clay.

The modified Y-type molecular sieve provided in the present application has one or more of the following advantages: high thermal and hydrothermal stability, high activity, and good coke selectivity; higher conversion activity for heavy oils and lower coke selectivity as compared to existing Y-type molecular sieves, when used for catalytic cracking of heavy oils; as well as higher gasoline yield, light oil yield and total liquid yield, and, with the introduction of phosphorus, higher yield of liquefied gas.

The method for the preparation of the modified Y-type molecular sieve provided in the present application can be used to produce high-silica Y-type molecular sieves rich in secondary pores with high crystallinity, high thermal stability and high hydrothermal stability, and can greatly improve the degree of ultra-stable treatment of the molecular sieve while maintaining a high crystallinity. The molecular sieve obtained has a uniform distribution of aluminum with low non-framework aluminum content and unobstructed secondary pores. When used for catalytic cracking of heavy oils, the modified Y-type molecular sieve shows good coke selectivity, high cracking activity for heavy oils, and increased gasoline yield, liquefied gas yield and total liquid yield.

The modified Y-type molecular sieve provided in the present application can be used as an active component of a catalytic cracking catalyst for the conversion of heavy oils or inferior oils. The catalytic cracking catalyst comprising the molecular sieve as the active component shows strong conversion capacity for heavy oils, high stability, good coke selectivity and high light oil yield and gasoline yield.

The catalytic cracking catalyst provided in the present application has high thermal and hydrothermal stability, and high activity. When used for catalytic cracking of heavy oils, the catalyst shows good coke selectivity, high gasoline yield, light oil yield and total liquid yield.

The catalyst according to the present application is useful for catalytic cracking of various hydrocarbon oils, and is especially useful for catalytic cracking of heavy oils, and suitable hydrocarbon oils include, but not limited to, atmospheric residue, vacuum residue, vacuum gas oil, atmospheric gas oil, straight-run gas oil, light/heavy propane deasphalted oil and cooker gas oil.

BRIEF DESCRIPTION OF THE DRAWINGS

The drawings, which form a part of the description, are provided to assist in further understanding of the present application and to further illustrate the present application in conjunction with the embodiments described hereinbelow, and are not intended to limit the present invention in any manner. In the drawings:

FIG. 1 is a schematic diagram showing a dual probable pore size distribution of the modified Y-type molecular sieve according to the present application.

DETAILED DESCRIPTION OF THE INVENTION

The embodiments of the present application will be described in detail below with reference to the drawings. It is to be understood that the embodiments described herein are merely illustrative and not restrictive.

Any numerical value (including the end values of numerical ranges) provided herein is not limited to the precise value recited, but should be interpreted as covering any value close to said precise value. Moreover, for any numerical range provided herein, one or more new numerical ranges can be obtained by arbitrarily combining the end values of the range, an end value with a specific value provided within the range, or various specific values provided within the range. Such new numerical ranges should also be considered as being specifically disclosed herein.

The RIPP test methods involved in the present application can be found in "Petrochemical Analysis Methods (RIPP Test Methods)", edited by Cuiding YANG et al., Science Press, September 1990, First Edition, pages 263-268, 412-415 and 424-426, ISBN: 7-03-001894-X, which is incorporated herein by reference in its entirety.

All patent and non-patent literatures mentioned herein, including but not limited to textbooks and journal articles, are hereby incorporated by reference in their entirety.

As used herein, the terms "Y-type molecular sieve" and "Y-type zeolite" are used interchangeably, and the terms "NaY molecular sieve" and "NaY zeolite" are also used interchangeably.

As used herein, the term "secondary pores" refers to the pores having a pore size (i.e. pore diameter) of from 2 nm to 100 nm in the molecular sieve.

As used herein, the term "inorganic acid having a medium or higher strength" refers to an inorganic acid having an acid strength not lower than that of $HNO_2$ (nitrous acid), including but not limited to $HClO_4$ (perchloric acid), HI (hydrogen iodide), HBr (hydrobromic acid), HCl (hydrochloric acid), $HNO_3$ (nitric acid), $H_2SeO_4$ (selenic acid), $H_2SO_4$ (sulfuric acid), $HClO_3$ (chloric acid), $H_2SO_3$ (sulfuric acid), $H_3PO_3$ (phosphoric acid), and $HNO_2$ (nitrous acid), and the like.

As used herein, the terms "rare earth solution" and "rare earth salt solution" are used interchangeably, and are preferably an aqueous solution of a rare earth salt.

As used herein, the expression "Y-type molecular sieve having a normal lattice constant" means that the lattice constant of the Y-type molecular sieve is within the range of the lattice constant of conventional NaY molecular sieves, which is preferably in a range of about 2.465 nm to about 2.472 nm.

As used herein, the term "atmospheric pressure" means a pressure of about 1 atm.

As used herein, the weight, on a dry basis, of a material refers to the weight of the solid product obtained after calcining the material at 800° C. for 1 hour.

In a first aspect, the present application provides a modified Y-type molecular sieve having a rare earth oxide content of about 4% to about 12% by weight, a phosphorus content of about 0% to about 10% by weight on the basis of $P_2O_5$, a sodium oxide content ($Na_2O$ content) of no more than about 1.0% by weight, preferably no more than about 0.5% by weight, for example, about 0.05% to about 0.5% by weight, a total pore volume of about 0.36 mL/g to about 0.48 mL/g, a percentage of the pore volume of secondary pores having a pore size of 2-100 nm to the total pore volume of the modified Y-type molecular sieve of about 20% to about 40%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

In a preferred embodiment, the modified Y-type molecular sieve provided in the present application has a lattice collapse temperature of not lower than about 1060° C. Preferably, the molecular sieve has a lattice collapse temperature of about 1060° C. to about 1085° C., for example about 1065° C. to about 1085° C., about 1067° C. to about 1080° C. or about 1064° C. to about 1081° C.

In a preferred embodiment, the modified Y-type molecular sieve provided in the present application has a ratio of B acid to L acid in the total acid content of the modified Y-type molecular sieve of about 3.5 to about 6.0, for example, about 3.5-5.5, about 3.6-5.5, about 3.5-5.0 or about 3.5-4.6, as determined by pyridine adsorption infrared spectroscopy at 200° C.

In a preferred embodiment, the modified Y-type molecular sieve provided in the present application has a lattice constant of about 2.440 nm or about 2.455 nm, for example, 2.442-2.453 nm or 2.442-2.451 nm.

In a preferred embodiment, the modified Y-type molecular sieve provided in the present application is a high-silica Y-type molecular sieve having a framework silica-alumina ratio ($SiO_2/Al_2O_3$ molar ratio) of about 7 to about 14, for example, about 7.8-12.6, about 8.5-12.6, about 8.7-12 or about 9.2-11.4.

In a preferred embodiment, the modified Y-type molecular sieve provided in the present application has a percentage of non-framework aluminum content to the total aluminum content of no more than about 10%, for example from about 5% to about 9.5% by weight or from about 6% to about 9.5% by weight.

In a preferred embodiment, the modified Y-type molecular sieve provided in the present application has a relative crystallinity retention of about 38% or more, for example, about 38-65%, about 38-60%, about 50-60%, about 46-58%, about 46-60% or about 52-60%, after aging for 17 hours at 800° C. under atmospheric pressure in an atmosphere of 100 vol % steam.

In a preferred embodiment, the modified Y-type molecular sieve provided in the present application has a relative crystallinity of no less than about 70%, for example, about 70% to about 80%, particularly about 70-76% or about 71-77%.

In a preferred embodiment, the modified Y-type molecular sieve provided in the present application has a specific surface area of about 600 $m^2/g$ to about 680 $m^2/g$, for example, about 600-670 $m^2/g$, about 610-670 $m^2/g$, about 640-670 $m^2/g$ or about 646-667 $m^2/g$.

In a preferred embodiment, the modified Y-type molecular sieve provided in the present application has a total pore volume of about 0.36 mL/g to about 0.48 mL/g, for example, about 0.38-0.45 mL/g, about 0.38-0.42 mL/g, or about 0.4-0.48 mL/g.

In a preferred embodiment, the modified Y-type molecular sieve provided in the present application has a pore volume of secondary pores having a pore size of 2.0 nm to 100 nm of about 0.08 mL/g to about 0.18 mL/g, for example, about 0.1 to about 0.16 mL/g.

In a preferred embodiment, the modified Y-type molecular sieve provided in the present application has a percentage of the pore volume of secondary pores having a pore size of 2.0 nm to 100 nm to the total pore volume of about 20% to about 40%, for example, about 20-38%, about 25-38%, about 28-38% or about 25-35%.

In a further preferred embodiment, the percentage of the total pore volume of secondary pores having a pore size of 8-100 nm to the total pore volume of secondary pores having a pore size of 2-100 nm of the modified Y-type molecular sieve is about 40% to about 80%, for example, about 45-75% or about 55-77%.

In a preferred embodiment, the modified Y-type molecular sieve provided in the present application has a rare earth oxide content, on the basis of $RE_2O_3$, of about 4% to about 12% by weight, for example, about 4% to about 11% by weight or about 5% to about 12% by weight, preferably about 4.5-10% by weight, about 5.5-10% by weight or about 5-9% by weight.

In a preferred embodiment, the modified Y-type molecular sieve provided in the present application comprises phosphorus element, and the modified Y-type molecular sieve has a phosphorus content, on the basis of $P_2O_5$, of about 0.05% to about 10% by weight, preferably 0.1-6 wt %, for example about 1-4% by weight.

In a preferred embodiment, the modified Y-type molecular sieve provided in the present application has a sodium oxide content of no more than about 0.5%, about 0.05% to about 0.5% by weight, for example, about 0.1% to about 0.4% by weight, about 0.05-0.3% by weight or about 0.15-0.3% by weight.

In certain preferred embodiments, the modified Y-type molecular sieves provided herein have a rare earth oxide content of from about 4% to about 12% by weight, for example from about 4% to about 11% by weight, from about 5% to about 12% by weight, from about 4.5% to about 10% by weight or from about 5.5% to about 10% by weight; a phosphorus content, on the basis of $P_2O_5$, of about 0% to about 10% by weight, for example about 0.05% to about 10% by weight, about 0.1% to about 6% by weight or about 0.1% to about 5% by weight; a sodium oxide content of about 0.05% to about 0.5% by weight, for example about 0.1% to about 0.4% by weight or about 0.05% to about 0.3% by weight, preferably less than 0.2% by weight; a total pore volume of about 0.36 mL/g to about 0.48 mL/g, a percentage of the pore volume of secondary pores having a pore size of about 2-100 nm to the total pore volume of about 20% to about 38%, for example, about 28% to about 38% or about 25% to about 35%; a lattice constant of about 2.440 nm to about 2.455 nm, for example, 2.441-2.453 nm, 2.442-2.451 nm or 2.442-2.453 nm; a framework silica-alumina ratio ($SiO_2/Al_2O_3$ molar ratio) of about 7 to about 14, for example about 7.8-12.6, about 8.5-12.6 or about 9.2-11.4; a percentage of non-framework aluminum content to the total aluminum content of the molecular sieve of no more than about 10%, for example about 6-9.5% or about 3-9%; a relative crystallinity of no less than about 60%, for example no less than about 70%, no less than about 71%, or about 70% to about 80%; a lattice collapse temperature of about 1065° C. to about 1080° C.; and a ratio of B acid to L acid in the total acid content of the modified Y-type molecular sieve of no less than about 3.50, for example, about 3.5 to about 6, preferably about 3.5-4.6 or about 3.6-4.6, as determined by pyridine adsorption infrared spectroscopy at 200° C.

In certain preferred embodiments, the modified Y-type molecular sieve provided in the present application is an ultra-stable Y-type molecular sieve containing phosphorus and rare earth that is rich in secondary pores, in which the secondary pores having a pore size of 2-100 nm show a dual probable pore size distribution. As shown in FIG. 1, the most probable pore size of secondary pores having a relatively smaller pore size is about 2-5 nm, and the most probable pore size of secondary pores having a relatively larger pore size is about 6-20 nm, for example, about 8-20 nm or about 8-18 nm. More preferably, the percentage of the total pore volume of secondary pores having a pore size of 8 to 100 nm to the total pore volume of secondary pores having a pore size of 2 to 100 nm is about 40-80%, for example, about 45-75%, about 45-77%, about 45-55% or about 55-77%. Further preferably, the modified Y-type molecular sieve has a $SiO_2/Al_2O_3$ ratio of about 7 to about 14, for example about 7.8-13 or about 8.5-12.6, and a lattice constant of about 2.440-2.455 nm, for example 2.441-2.453 nm or 2.442-2.453 nm.

In a preferred embodiment, the preparation of the modified Y-type molecular sieve provided in the present application comprises the step of contacting the Y-type molecular sieve with silicon tetrachloride for Si—Al isomorphous substitution reaction.

In certain embodiments, the modified Y-type molecular sieve provided in the present application does not show a "surface enrichment of silicon", but shows a ratio of surface $SiO_2/Al_2O_3$ molar ratio to framework $SiO_2/Al_2O_3$ molar ratio of less than or equal to 1, typically less than 1.

In a second aspect, the present application provides a method for the preparation of modified Y-type molecular sieves, comprising the steps of:

(1) contacting a NaY molecular sieve with a rare earth solution for ion-exchange reaction, to obtain a rare earth modified Y-type molecular sieve having a normal lattice constant and a reduced sodium oxide content;

(2) subjecting the Y-type molecular sieve obtained in the step (1) to a modification treatment to obtain a Y-type molecular sieve having a reduced lattice constant, wherein the modification treatment is performed by subjecting the Y-type molecular sieve obtained in the step (1) to roasting at a temperature of about 350° C. to about 520° C., preferably 350-480° C., in an atmosphere containing about 30% to about 90% by volume of steam (also called 30-90% by volume of steam atmosphere or 30-90% steam), preferably about 35-85% by volume of steam for about 4.5 hours to about 7 hours;

(3) contacting and reacting the Y-type molecular sieve obtained in the step (2) with gaseous $SiCl_4$, preferably under the following conditions: a temperature of about 200° C. to about 650° C., a weight ratio of $SiCl_4$ to the Y-type molecular sieve on a dry basis of about 0.1:1 to about 0.7:1, and a reaction time of about 10 minutes to about 5 hours, to obtain a gas phase ultra-stabilized Y-type molecular sieve;

(4) contacting the gas phase ultra-stabilized Y-type molecular sieve obtained in the step (3) with an acid solution for modification, to obtain an acid-treated modified Y-type molecular sieve; and (5) optionally, subjecting the acid-treated modified Y-type molecular sieve obtained in the step (4) to phosphorus modification by contacting with a phosphorus compound.

In some preferred embodiments, in the step (1) of the method for the preparation of modified Y-type molecular sieves provided in the present application, an ion-exchange reaction between a NaY molecular sieve and a rare earth solution is conducted to obtain a rare earth modified Y-type molecular sieve having a normal lattice constant and a reduced sodium oxide content. The NaY molecular sieve is either commercially available or prepared according to existing methods. In a preferred embodiment, the NaY molecular sieve has a lattice constant of about 2.465-2.472 nm, a framework silica-alumina ratio ($SiO_2/Al_2O_3$ molar ratio) of about 4.5-5.2, a relative crystallinity of about 85% or more, for example, about 85-95%, and a sodium oxide content of about 13.0-13.8 wt %.

In a preferred embodiment, the NaY molecular sieve is subjected to an ion-exchange reaction with a rare earth solution in the step (1) at an ion-exchange temperature of preferably about 15-95° C., for example, about 20-65° C. or 65-95° C.; for an ion-exchange time of preferably about 30-120 minutes, for example about 45-90 minutes; at a weight ratio of NaY molecular sieve (on a dry basis):rare earth salt (on the basis of $RE_2O_3$):$H_2O$ of about 1:0.01-0.18:5-20.

In a preferred embodiment, the NaY molecular sieve is subjected to an ion-exchange reaction with the rare earth solution by mixing the NaY molecular sieve, the rare earth salt and water at a weight ratio of the NaY molecular sieve:

the rare earth salt:H$_2$O of about 1:0.01-0.18:5-15 to form a mixture, and stirring at a temperature of about 15-95° C., for example, from room temperature to about 60° C., about 65-95° C., about 20-60° C. or about 30-45° C., preferably for about 30-120 minutes to conduct an exchange between rare earth ions and sodium ions.

In a preferred embodiment, the weight ratio of the NaY molecular sieve to water is from about 1:6 to about 1:20, preferably from about 1:7 to about 1:15. The mixture of the NaY molecular sieve, the rare earth salt and water can be formed by mixing the NaY molecular sieve and water to form a slurry, and then adding to the slurry the rare earth salt and/or an aqueous solution of the rare earth salt. The rare earth solution can be a solution of the rare earth salt. The rare earth salt is preferably a rare earth chloride and/or a rare earth nitrate. The rare earth is, for example, one or more of La, Ce, Pr, Nd and mixed rare earths. Preferably, the mixed rare earth comprises one or more of La, Ce, Pr and Nd, or further comprises at least one of rare earths other than La, Ce, Pr, and Nd.

In a preferred embodiment, step (1) further comprises a washing step for the purpose of washing away the exchanged sodium ions, for example, using deionized water or decationized water.

In a preferred embodiment, the rare earth modified Y-type molecular sieve having a normal lattice constant and a reduced sodium oxide content obtained in the step (1) has a rare earth content, on the basis of RE$_2$O$_3$, of about 4.5-13% by weight, about 5.5-14% by weight, about 7-14% by weight, about 7.5-13% by weight, about 5.5-13% by weight or about 5.5-12% by weight, a sodium oxide content of no more than about 9.5% by weight, for example about 5.5-9.5% by weight, about 5.5-8.5% by weight or about 5.5-7.5% by weight, and a lattice constant of about 2.465-2.472 nm.

In certain preferred embodiments, in the step (2) of the method for the preparation of modified Y-type molecular sieves provided in the present application, the rare earth modified Y-type molecular sieve having a normal lattice constant is subjected to a treatment at a temperature of about 350° C. to about 520° C., for example about 350-480° C., in an atmosphere containing about 30% to about 90% by volume of steam, for example, about 35% to about 85% by volume of steam, for about 4.5-7 hours.

In a preferred embodiment, in the step (2), the roasting temperature is about 380-460° C., the roasting atmosphere contains about 40-80 vol % of steam, and the roasting time is about 5-6 hours.

In a preferred embodiment, the steam atmosphere contains from about 30% to about 90% by volume of steam, and further comprises other gas(es), such as one or more of air, helium or nitrogen.

In certain preferred embodiments, the Y-type molecular sieve having a reduced lattice constant obtained in the step (2) has a lattice constant of about 2.450 nm to about 2.462 nm.

In a preferred embodiment, the Y-type molecular sieve obtained in the step (2) has a water content of no more than about 1% by weight, which is directly used in the reaction of the step (3).

In another preferred embodiment, the step (2) further comprises the step of drying the roasted Y-type molecular sieve to obtain a water content of no more than about 1% by weight.

In a preferred embodiment, the Y-type molecular sieve having a reduced lattice constant obtained in the step (2) has a solid content of no less than about 99% by weight.

In some preferred embodiments, in the step (3) of the method for the preparation of a modified Y-type molecular sieve provided in the present application, the weight ratio of SiCl$_4$ to the Y-type molecular sieve (on a dry basis) is preferably about 0.3-0.6:1, and the reaction temperature is preferably from about 350° C. to about 500° C.

In a preferred embodiment, the step (3) may further comprise a washing step, which may be carried out by a conventional washing method, using water such as deionized water or decationized water, for the purpose of removing soluble by-products such as Na$^+$, Cl$^-$, Al$^{3+}$ and the like remaining in the molecular sieve. For example, the washing conditions may include: a weight ratio of the washing water to the molecular sieve of about 5-20:1, usually a weight ratio of the molecular sieve:H$_2$O of about 1: 6-15, a pH of preferably about 2.5-5.0, and a washing temperature of about 30-60° C. Preferably, the washing is carried out to the extent that no free ions like Na$^+$, Cl$^-$ and Al$^{3+}$ can be detected in the spent washing liquid, and the content of each of the Na$^+$, Cl$^-$ and Al$^{3+}$ ions in the molecular sieve after washing is not more than about 0.05% by weight.

In some preferred embodiments, in the step (4) of the method for the preparation of modified Y-type molecular sieves provided in the present application, the gas phase ultra-stabilized Y-type molecular sieve obtained in the step (3) is contacted and reacted with an acid solution (which is referred to hereinafter as channel cleaning modification, or channel cleaning for short, or referred to as acid treatment modification).

In a preferred embodiment, said contacting and reacting the gas phase ultra-stabilized Y-type molecular sieve obtained in the step (3) with an acid solution is carried out by mixing the molecular sieve treated by gas phase ultra-stablization modification, i.e. the gas phase ultra-stablized Y-type molecular sieve, with the acid solution and reacting for a period of time, and then separating the molecular sieve after the reaction from the acid solution, for example, by filtration, and subjecting it optionally to washing (which is used to remove soluble by-products, such as Na$^+$, Cl$^-$, Al$^{3+}$, and the like, remaining in the molecular sieve, for example, under the following washing conditions: a weight ratio of the washing water to the molecular sieve of about 5-20:1, usually a weight ratio of the molecular sieve:H$_2$O of about 1: 6-15, a pH of preferably about 2.5-5.0, and a washing temperature of about 30-60° C.) and optionally to drying, to obtain the modified Y-type molecular sieve provided in the present application.

In a preferred embodiment, the gas phase ultra-stabilized Y-type molecular sieve obtained in the step (3) is contacted with the acid solution at a weight ratio of the acid to the molecular sieve (on a dry basis) of about 0.001-0.15:1, for example about 0.002-0.1:1 or 0.01-0.05:1, a weight ratio of water to the molecular sieve on a dry basis of about 5-20:1, for example about 8-15:1, and a reaction temperature of about 60-100° C., for example 80-99° C., preferably 88-98° C.

In a preferred embodiment, the acid in the acid solution (an aqueous acid solution) is at least one organic acid and at least one inorganic acid having a medium or higher strength. The organic acid may be one or more of oxalic acid, malonic acid, butanedioic acid (succinic acid), methyl succinic acid, malic acid, tartaric acid, citric acid, and salicylic acid. The inorganic acid having a medium or higher strength may be one or more of phosphoric acid, hydrochloric acid, nitric acid, and sulfuric acid.

In a preferred embodiment, the channel cleaning modification is carried out at a temperature of about 80-99° C., for example about 85-98° C., for a period of about 60 minutes or more, for example about 60-240 minutes or about 90-180 minutes. The weight ratio of the organic acid to the molecular sieve is about 0.01-0.10:1, for example, about 0.03-0.1:1 or 0.02-0.05:1; the weight ratio of the inorganic acid having a medium or higher strength to the molecular sieve is about 0.01-0.06:1, for example about 0.01-0.05:1 or 0.02-0.05:1, and the weight ratio of water to the molecular sieve is preferably from about 5:1 to about 20:1, for example from about 8:1 to about 15:1.

In a preferred embodiment, the channel cleaning modification is carried out in two stages, in which the molecular sieve is firstly contacted with an inorganic acid having a medium or higher strength, wherein the weight ratio of the inorganic acid having a medium or higher strength to the molecular sieve is about 0.01-0.05:1, for example about 0.02-0.05:1, the weight ratio of water to the molecular sieve is preferably about 5-20:1, for example about 8-15:1, and the reaction temperature is about 80-99° C., preferably 90-98° C., and the reaction time is about 60-120 minutes; and then the molecular sieve obtained after the treatment is contacted with an organic acid, wherein the weight ratio of the organic acid to the molecular sieve is about 0.02-0.1:1, for example, about 0.02-0.10:1 or 0.05-0.08:1, the weight ratio of water to the molecular sieve is preferably from about 5:1 to about 20:1, for example from about 8:1 to about 15:1, the reaction temperature is from about 80° C. to about 99° C., preferably from about 90° C. to about 98° C., and the reaction time is about 60 to 120 minutes, wherein the weight ratio is calculated using the weight of the molecular sieve on a dry basis.

In some preferred embodiments, in the method for the preparation of a modified Y-type molecular sieve provided in the present application, the acid-treated modified Y-type molecular sieve obtained in the step (4) is subjected to phosphorus modification in step (5) to introduce phosphorus into the molecular sieve. The phosphorus modification generally comprises contacting the acid-treated modified Y-type molecular sieve obtained in the step (4) with an exchange liquid containing a phosphorus compound typically at about 15-100° C., preferably at about 30-95° C., for 10-100 minutes, then filtering, and optionally washing. The weight ratio of water in the exchange liquid to the molecular sieve is from about 2 to about 5, preferably from about 3 to about 4, and the weight ratio of phosphorus (calculated on the basis of $P_2O_5$) to the molecular sieve is from about 0.0005 to about 0.10, preferably from about 0.001 to about 0.06. The phosphorus compound may be one or more selected from the group consisting of phosphoric acid, ammonium phosphate, ammonium dihydrogen phosphate, and diammonium hydrogen phosphate. The washing can be carried out, for example, with water, such as decationized or deionized water, in amount of about 5-15 times the weight of the molecular sieve.

In a preferred embodiment, the phosphorus modification can be carried out by the following: adding the acid-treated modified Y-type molecular sieve to an exchange liquid containing a phosphorus compound to conduct an ion-exchange reaction at about 15-100° C. for about 10-100 minutes, then filtering and washing; wherein in the mixture formed by the exchange liquid containing the phosphorus compound and the molecular sieve, the weight ratio of water to the molecular sieve is about 2-5, preferably about 3-4, and the weight ratio of phosphorus (calculated on the basis of $P_2O_5$) to the molecular sieve is from about 0.0005 to about 0.10, preferably from about 0.001 to about 0.06.

In a preferred embodiment, the present application provides a method for the preparation of a modified Y-type molecular sieve, comprising the steps of:

(1) subjecting the NaY molecular sieve to an ion-exchange reaction with a rare earth solution, filtering and washing to obtain a rare earth modified Y-type molecular sieve having a normal lattice constant and a reduced sodium oxide content, wherein the ion-exchange is carried out at a temperature of about 15-95° C., preferably about 65-95° C., for about 30-120 minutes under stirring;

(2) subjecting the Y-type molecular sieve obtained in the step (1) to roasting in an atmosphere containing about 30% to about 90% by volume of steam at a temperature of about 350-480° C. for about 4.5 hours to about 7 hours, and drying to obtain a Y-type molecular sieve having a reduced lattice constant and a water content of less than about 1% by weight, wherein the lattice constant of the Y-type molecular sieve having a reduced lattice constant is about 2.450-2.462 nm;

(3) contacting and reacting the Y-type molecular sieve obtained in the step (2) with a gaseous $SiCl_4$ vaporized by heat at a weight ratio of $SiCl_4$ to the Y-type molecular sieve (on a dry basis) of about 0.1:1 to about 0.7:1 and a temperature of about 200-650° C. for about 10 minutes to about 5 hours, optionally washing and filtering, to obtain a gas phase ultra-stablilized modified Y-type molecular sieve;

(4) subjecting the gas phase ultra-stablilized modified Y-type molecular sieve obtained in the step (3) to an acid treatment modification, wherein the gas phase ultra-stablilized modified Y-type molecular sieve obtained in the step (3) is firstly mixed and contacted with an inorganic acid having a medium or higher strength and water at about 80-99° C., preferably about 90-98° C., for at least about 30 minutes, for example about 60-120 minutes, and then an organic acid is added and further contacted at about 80-99° C., preferably about 90-98° C., for at least about 30 minutes, for example about 60-120 minutes, and the resultant is subjected to filtration, optionally to washing, and optionally to drying, to obtain an acid-treated modified Y-type molecular sieve, wherein preferably, the weight ratio of the organic acid to the molecular sieve on a dry basis is about 0.02-0.10:1, the weight ratio of the inorganic acid having a medium or higher strength to the molecular sieve on a dry basis is about 0.01-0.05:1, and the weight ratio of water to the molecular sieve is about 5-20:1, and (5) optionally, adding the acid-treated modified Y-type molecular sieve to an exchange liquid containing a phosphorus compound to conduct an ion-exchange reaction at about 15-100° C. for about 10-100 minutes, filtering, washing, and optionally drying, wherein the weight ratio of water in the exchange liquid to the molecular sieve is about 2-5, preferably about 3-4, and the weight ratio of phosphorus (calculated on the basis of $P_2O_5$) to the molecular sieve is about 0.005-0.10, preferably about 0.01-0.05.

In a third aspect, the present application provides a catalytic cracking catalyst comprising the modified Y-type molecular sieve according to the present application or a modified Y-type molecular sieve obtained by the method according to the present application.

In a preferred embodiment, the catalytic cracking catalyst provided in the present application comprises about 10% to about 50% by weight, on a dry basis, of the modified Y-type molecular sieve, and about 10% to about 40% by weight of an alumina binder calculated on the basis of alumina, and about 10% to about 80% by weight, on a dry basis, of clay.

In a preferred embodiment, the modified Y-type molecular sieve is present in the catalytic cracking catalyst provided in the present application in an amount, on a dry basis, of about 15% to about 45% by weight, for example, about 25% to about 40% by weight.

In certain preferred embodiments, in the catalytic cracking catalyst provided in the present application, the clay is one or more selected from the group consisting of clays suitable for use as a component in cracking catalysts, such as such as one or more of kaolin, hydrated halloysite, montmorillonite, diatomite, halloysite, saponite, rector, sepiolite, attapulgite, hydrotalcite, and bentonite. These clays are well known to those of ordinary skill in the art. Preferably, the clay is present in the catalytic cracking catalyst provided in the present application in an amount, on a dry basis, of from about 20% to about 55% by weight, preferably from about 30% to about 50% by weight.

In certain preferred embodiments, in the catalytic cracking catalyst provided in the present application, the alumina binder is present in an amount of from about 10% to about 40% by weight, for example from about 20% to about 35% by weight. Preferably, the alumina binder of the present application is one or more selected from the group consisting of the various forms of alumina, hydrated alumina, and aluminum sol typically used in cracking catalysts. For example, it can be one or more selected from the group consisting of γ-alumina, η-alumina, θ-alumina, χ-alumina, pseudoboemite, boehmite, gibbsite, bayerite or aluminum sol, preferably pseudoboehmite and aluminum sol. For example, the catalytic cracking catalyst may comprise from about 2% to about 15% by weight, preferably from about 3% to about 10% by weight, of an aluminium sol calculated on the basis of alumina, and about 10-30% by weight, preferably about 15-25% by weight, of pseudoboehmite calculated on the basis of alumina.

In some preferred embodiments, the catalyst provided in the present application may further comprise an additional molecular sieve other than the modified Y-type molecular sieve, and the additional molecular sieve may be present in an amount, on a dry basis, of about 0% to about 40% by weight, for example from about 0% to about 30% by weight or from about 1% to about 20% by weight, based on the weight of the catalyst. The additional molecule sieve can be selected from molecular sieves useful in catalytic cracking catalysts, such as one or more of zeolites having MFI structure, Beta zeolite, other Y zeolites, and non-zeolitic molecular sieves. Preferably, the additional Y-type molecular sieve is present in an amount, on a dry basis, of no more than about 40% by weight, for example from about 1% to about 40% by weight or from about 0% to about 20% by weight. The additional Y-type molecular sieve may be, for example, one or more of REY, REHY, DASY, SOY, and PSRY; the zeolite having MFI structure may be, for example, one or more of HZSM-5, ZRP, and ZSP; the beta zeolite may be, for example, HP; and the non-zeolitic molecular sieve may be, for example, one or more of aluminum phosphate molecular sieves (AlPO molecular sieves) and silicoaluminophosphate molecular sieves (SAPO molecular sieves).

In a fourth aspect, the present application provides a method for the preparation of a catalytic cracking catalyst, comprising the steps of: providing a modified Y-type molecular sieve according to the present application or a modified Y-type molecular sieve obtained by the method according to the present application, forming a slurry comprising the modified Y-type molecular sieve, an alumina binder, clay and water, and spray drying, and optionally washing and drying.

In the method for the preparation of a catalyst according to the present application, all steps, except for the step of providing a modified Y-type molecular sieve according to the present application or a modified Y-type molecular sieve obtained by the method according to the present application, may be carried out in accordance with known methods, for example, according to the methods disclosed in the patent application publication Nos. CN1098130A and CN1362472A, which are incorporated herein by reference in their entirety. Further, said spray drying, washing, and drying are conventional technical means, and the present application has no special requirements.

Particularly preferably, the present application provides the following preferred embodiments:

Item 1. A modified Y-type molecular sieve, characterized in that the modified Y-type molecular sieve has a rare earth oxide content of about 4-12% by weight, a phosphorus content of about 0% to about 10% by weight on the basis of $P_2O_5$, a sodium oxide content of no more than about 0.5% by weight, a total pore volume of about 0.36 mL/g to about 0.48 mL/g, a percentage of the pore volume of secondary pores having a pore size of 2-100 nm to the total pore volume of the modified Y-type molecular sieve of about 20%-40%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

Item 2. A modified Y-type molecular sieve, characterized in that the modified Y-type molecular sieve has a rare earth oxide content of about 5% to about 12% by weight, a sodium oxide content of no more than about 0.5% by weight, a total pore volume of about 0.36-0.48 mL/g, a percentage of the pore volume of secondary pores having a pore size of 2-100 nm to the total pore volume of about 20%-38%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

Item 3. A modified Y-type molecular sieve, characterized in that the modified Y-type molecular sieve has a rare earth oxide content of about 4% to about 11% by weight, a phosphorus content of about 0.5% to about 10% by weight on the basis of $P_2O_5$, a sodium oxide content of no more than about 0.5% by weight, a total pore volume of about 0.36 mL/g to about 0.48 mL/g, a percentage of the pore volume of secondary pores having a pore size of 2-100 nm to the total pore volume of the modified Y-type molecular sieve of about 20%-40%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

Item 4. The modified Y-type molecular sieve according to any one of Items 1-3, characterized in that the percentage of the pore volume of secondary pores having a pore size of 2-100 nm to the total pore volume of the modified Y-type molecular sieve is about 28-38%.

Item 5. The modified Y-type molecular sieve according to any one of Items 1 to 4, characterized in that the percentage of the non-framework aluminum content to the total aluminum content of the modified Y-type molecular sieve is about 5% to about 9.5% by weight, and the framework silica-alumina ratio in terms of the $SiO_2/Al_2O_3$ molar ratio is about 7 to about 14.

Item 6. The modified Y-type molecular sieve according to any one of Items 1 to 5, characterized in that the modified Y-type molecular sieve has a lattice collapse temperature of about 1060° C. to about 1085° C.

Item 7. The modified Y-type molecular sieve according to any one of Items 1-6, characterized in that the ratio of B acid to L acid in the total acid content of the modified Y-type molecular sieve is about 3.5 to about 6, as determined by pyridine adsorption infrared spectroscopy at 200° C.

Item 8. The modified Y-type molecular sieve according to any one of Items 1 to 7, characterized in that, after aging at 800° C. under atmospheric pressure in 100% steam atmosphere for 17 hours, the modified Y-type molecular sieve shows a relative crystallinity retention of about 38% or more, for example, about 38-60% or about 50-60%.

Item 9. The modified Y-type molecular sieve according to any one of Items 1-8, characterized in that the modified Y-type molecular sieve has a relative crystallinity of about 70% to about 80%.

Item 10. The modified Y-type molecular sieve according to any one of Items 1-9, characterized in that the modified Y-type molecular sieve has a rare earth oxide content of about 4.5% to about 10% by weight, a phosphorus content of about 0.1-6% by weight on the basis of $P_2O_5$, a sodium oxide content of about 0.05-0.3% by weight, a lattice constant of 2.442-2.451 nm, a framework silica-alumina ratio of about 8.5-12.6; or the modified Y-type molecular sieve has a rare earth oxide content of about 5.5% to about 10% by weight, a sodium oxide content of about 0.15-0.3% by weight, a lattice constant of 2.442-2.453 nm, and a framework silica-alumina ratio of about 7.8-12.6.

Item 11. The modified Y-type molecular sieve according to any one of Items 1 to 10, characterized in that a percentage of the total pore volume of secondary pores having a pore size of 8-100 nm to the total pore volume of secondary pores having a pore size of 2-100 nm of the modified Y-type molecular sieve is about 40-80%.

Item 12. A method for the preparation of a modified Y-type molecular sieve, comprising the steps of:

(1) contacting a NaY molecular sieve with a rare earth salt solution for ion-exchange reaction, filtering, washing, and optionally drying to obtain a rare earth modified Y-type molecular sieve having a normal lattice constant and a reduced sodium oxide content;

(2) subjecting the above-mentioned rare earth modified Y-type molecular sieve having a normal lattice constant and a reduced sodium oxide content to roasting at a temperature of 350-520° C. or 350-480° C. in an atmosphere containing 30-95 vol % or 30-90 vol % of steam for 4.5-7 hours, and optionally drying, to obtain a Y-type molecular sieve having a reduced lattice constant;

(3) contacting and reacting the Y-type molecular sieve having a reduced lattice constant with gaseous silicon tetrachloride at a weight ratio of $SiCl_4$ to the Y-type molecular sieve having a reduced lattice constant on a dry basis of 0.1:1 to 0.7:1, and a reaction temperature of about 200-650° C., for a period of about 10 minutes to 5 hours, optionally washing and filtering to obtain a gas phase ultra-stabilized Y-type molecular sieve;

(4) contacting the gas phase ultra-stabilized Y-type molecular sieve obtained in the step (3) with an acid solution; and (5) optionally, subjecting the molecular sieve obtained by contacting with the acid solution in the step (4) to phosphorus modification by contacting with a phosphorus compound.

Item 13. The method according to Item 12, characterized in that the rare earth modified Y-type molecular sieve having a normal lattice constant and a reduced sodium oxide content obtained in the step (1) has a lattice constant of about 2.465-2.472 nm, and a sodium oxide content of no more than about 9.0% by weight.

Item 14. The method according to Item 12, characterized in that the rare earth modified Y-type molecular sieve having a normal lattice constant and a reduced sodium oxide content obtained in the step (1) has a rare earth content of about 4.5-13% by weight on the basis of $RE_2O_3$, a sodium oxide content of about 4.5-9.5 wt %, and a lattice constant of about 2.465-2.472 nm.

Item 15. The method according to any one of Items 12-14, characterized in that, in the step (1), said contacting the NaY molecular sieve with the rare earth salt solution for ion-exchange reaction is carried out by forming a mixture of NaY molecular sieve, rare earth salt and water at a weight ratio of the NaY molecular sieve:rare earth salt:$H_2O$ of about 1:0.01-0.18:5-20, and stirring.

Item 16. The method according to any one of Items 12-15, characterized in that, in the step (1), said contacting the NaY molecular sieve with the rare earth solution for ion-exchange reaction comprises: mixing the NaY molecular sieve with decationized water, adding a rare earth salt and/or a rare earth salt solution with stirring for ion-exchange reaction, filtering, and washing; wherein the conditions for the ion-exchange reaction include: an ion-exchange temperature of about 15-95° C., an ion-exchange time of about 30-120 minutes, and an aqueous rare earth salt solution used as the rare earth salt solution.

Item 17. The method according to any one of Items 12-16, characterized in that the rare earth salt is rare earth chloride and/or rare earth nitrate, and the phosphorus compound is one or more selected from the group consisting of phosphoric acid, ammonium phosphate, ammonium dihydrogen phosphate and diammonium hydrogen phosphate.

Item 18. The method according to any one of Items 12-17, characterized in that, in the step (2), the roasting temperature is about 380-480° C., preferably about 380-460° C., the roasting atmosphere is an atmosphere containing about 40-80 vol % steam, and the roasting time is about 5-6 hours.

Item 19. The method according to any one of Items 12-18, characterized in that the Y-type molecular sieve having a reduced lattice constant obtained in the step (2) has a lattice constant of about 2.450-2.462 nm and a water content of no more than about 1% by weight.

Item 20. The method according to any one of Items 12 to 19, characterized in that the washing in the step (3) is carried out using water under the following conditions: a ratio of molecular sieve:$H_2O$ of about 1: 6-15, a pH value of about 2.5-5.0 and a washing temperature of about 30-60° C.

Item 21. The method according to any one of Items 12 to 20, characterized in that, in the step (4), said contacting the gas phase ultra-stabilized Y-type molecular sieve obtained in the step (3) with the acid solution is carried out under the following conditions: a weight ratio of acid to the molecular sieve of about 0.001-0.15:1, a weight ratio of water to the molecular sieve of about 5-20:1, an acid that is one or more of organic acids and inorganic acids, a contact time of about 60 minutes or more, preferably about 1-4 hours, and a contact temperature of about 80-99° C.

Item 22. The method according to any one of Items 12 to 20, characterized in that the acid solution used in the step (4) comprises an organic acid and an inorganic acid having a medium or higher strength, wherein the weight ratio of the inorganic acid having a medium or higher strength to the molecular sieve is about 0.01-0.05:1, the weight ratio of the organic acid to the molecular sieve is about 0.02-0.10:1, the weight ratio of water to the molecular sieve is about 5-20:1, and the contact temperature is about 80-99° C., and the contact time is about 1-4 hours.

Item 23. The method according to any one of Items 12 to 20, characterized in that, in the step (4), the contacting with the acid solution is carried out by first contacting with the inorganic acid having a medium or higher strength, and then contacting with the organic acid, wherein the contacting with the inorganic acid having a medium or higher strength is carried out under the following conditions: a weight ratio of the inorganic acid to the molecular sieve of about 0.01-0.05:1, a weight ratio of water to the molecular sieve of about 5-20:1, a contact time of about 60-120 minutes, and a contact temperature of about 90-98° C.; and the contacting with the organic acid is carried out under the following conditions: a weight ratio of the organic acid to the molecular sieve of about 0.02-0.10:1, a weight ratio of water to the molecular sieve of about 5-20:1, a contact time of about 60-120 minutes, and a contact temperature of about 90-98° C.

Item 24. The method according to any one of Items 21 to 23, characterized in that the organic acid is one or more selected from the group consisting of oxalic acid, malonic acid, succinic acid, methyl succinic acid, malic acid, tartaric acid, citric acid and salicylic acid; the inorganic acid having a medium or higher strength is one or more selected from the group consisting of phosphoric acid, hydrochloric acid, nitric acid and sulfuric acid.

Item 25. The method according to any one of Items 12 to 24, characterized in that, in the step (5), the phosphorus modification is carried out by: contacting the molecular sieve obtained by contacting with the acid solution in the step (4) with the exchange liquid containing a phosphorus compound to conduct an ion-exchange reaction at about 15-100° C. for about 10-100 minutes, filtering, and washing; wherein, in the mixture formed by contacting the exchange liquid with the molecular sieve, the weight ratio of water to the molecular sieve is about 2-5, preferably about 3-4, and the weight ratio of phosphorus (calculated on the basis of $P_2O_5$) to the molecular sieve is from about 0.0005 to about 0.10, preferably from about 0.001 to about 0.06.

Item 26. A catalytic cracking catalyst, comprising from about 10% to about 50% by weight, on a dry basis, of the modified Y-type molecular sieve according to any one of Items 1-11, or a modified Y-type molecular sieve obtained by the method according to any one of Items 12-25, from about 10% to about 40% by weight of an alumina binder calculated on the basis of alumina, and about 10-80% by weight, on a dry basis, of clay.

Item 27. A catalytic cracking catalyst, comprising about 10% to about 50% by weight, on a dry basis, of modified Y-type molecular sieve, about 10% to about 40% by weight of an alumina binder calculated on the basis of alumina, and about 10-80% by weight, on a dry basis, of clay, wherein the modified Y-type molecular sieve has a rare earth oxide content of about 5% to about 12% by weight, a sodium oxide content of no more than about 0.5% by weight, a total pore volume of about 0.36 to 0.48 mL/g, a percentage of the pore volume of secondary pores having a pore size of 2-100 nm to the total pore volume of about 20-38%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of B acid to L acid in the total acid content of the modified Y-type molecular sieve of no less than about 3.5, as determined by pyridine adsorption infrared spectroscopy at 200° C.

Item 28. A catalytic cracking catalyst, comprising about 10% to about 50% by weight, on a dry basis, of a phosphorus and rare earth modified Y-type molecular sieve, 10-40% by weight of an alumina binder calculated on the basis of alumina, and 10 to 80% by weight, on a dry basis, of clay, wherein the phosphorus and rare earth modified Y-type molecular sieve has a rare earth oxide content of about 4% to about 11% by weight, a phosphorus content of about 0.5% to about 10% by weight on the basis of $P_2O_5$, a sodium oxide content of no more than about 0.5% by weight, a total pore volume of about 0.36 mL/g to about 0.48 mL/g, a percentage of the pore volume of secondary pores having a pore size of 2-100 nm to the total pore volume of the phosphorus and rare earth modified Y-type molecular sieve of about 20-40%, a lattice constant of about 2.440 nm to about 2.455 nm, a percentage of the non-framework aluminum content to the total aluminum content of the phosphorus and rare earth modified Y-type molecular sieve of no more than about 10%, a lattice collapse temperature of not lower than about 1060° C., and a ratio of B acid to L acid in the total acid content of the phosphorus and rare earth modified Y-type molecular sieve of no less than about 3.5, as determined by pyridine adsorption infrared spectroscopy at 200° C.

EXAMPLES

The present application will be further illustrated by the following examples, without however limiting the present invention.

Feedstocks: In the following examples and comparative examples, NaY molecular sieves are supplied by Qilu Branch of Sinopec Catalyst Co., Ltd., of which the sodium oxide content is 13.5% by weight, the framework silica-alumina ratio ($SiO_2/Al_2O_3$ molar ratio) is 4.6, the lattice constant is 2.470 nm, and the relative crystallinity is 90%; rare earth chloride and rare earth nitrate are chemically pure reagents produced by Beijing Chemical Plant; pseudo-boehmite is an industrial product produced by Shandong Aluminum Plant with a solid content of 61% by weight; kaolin is produced by China Kaolin Clay Co., Ltd. of Suzhou with a solid content of 76% by weight; aluminum sol is supplied by Qilu Branch of Sinopec Catalyst Co., Ltd. having an alumina content of 21% by weight.

Analytical method: In each of the comparative examples and examples, the element content of the molecular sieve was determined by X-ray fluorescence spectrometry; the lattice constant and relative crystallinity of the molecular sieve were determined by X-ray powder diffraction (XRD) according to the RIPP 145-90, RIPP 146-90 standard method (see "Petrochemical Analysis Methods (RIPP Test Methods)", edited by Cuiding YANG et al., Science Press, September 1990, First Edition, pp. 412-415), the framework silica-alumina ratio of the molecular sieve was calculated according to the following equation:

$$SiO_2/Al_2O_3=(2.5858-a_0)\times 2/(a_0-2.4191)$$

wherein $a_0$ refers to the lattice constant of which the unit is nm.

The total silica-alumina ratio of the molecular sieve was calculated based on the content of Si and Al elements determined by X-ray fluorescence spectrometry. The percentage of the framework Al content to the total Al content was calculated based on the framework silica-alumina ratio determined by XRD and the total silica-alumina ratio determined by XRF, and then the percentage of non-framework Al content to the total Al content was calculated. The lattice collapse temperature was determined by differential thermal analysis (DTA).

In each of the comparative examples and examples, the acid center type of the molecular sieve and the acid content thereof were determined by pyridine adsorption infrared spectroscopy. The instrument was IFS113V type FT-IR (Fourier transform infrared) spectrometer of Bruker Company, USA. The method for determining B acid content and L acid content in the total acid content by pyridine adsorption infrared spectroscopy at 200° C. was as follows: a self-supported sample tablet was placed in an in-situ cell of an infrared spectrometer and sealed; the sample was heated to a temperature of 400° C., vacuumed to $10^{-3}$ Pa, and maintained at the temperature for 2 h to remove the gas molecules adsorbed by the sample; the sample was cooled to room temperature, a pyridine vapor at a pressure of 2.67 Pa was introduced, and the sample was maintained under such conditions for 30 min to achieve an adsorption equilibrium; then the sample was heated to a temperature of 200° C., and vacuumed to $10^{-3}$ Pa for desorption for 30 min; after that, the sample was cooled to room temperature and subjected to spectrographic analysis at a scanning wave number range of 1400 cm$^{-1}$ to 1700 cm$^{-1}$, and the pyridine adsorption infrared spectrum of the sample desorbed at 200° C. was obtained. The relative amount of the total Brönsted acid center (B acid center) and the Lewis acid center (L acid center) in the molecular sieve was obtained based on the intensity of the characteristic adsorption peaks at 1540 cm' and 1450 cm' in the pyridine adsorption infrared spectrum.

In each of the comparative examples and examples, the method for determining the pore volume of secondary pores was as follows: according to the RIPP 151-90 standard method (see "Petrochemical Analysis Methods (RIPP Test Methods)", Cuiding YANG et al., Science Press, September 1990, First Edition, pp. 424-426), the total pore volume of the molecular sieve was determined based on the adsorption isotherm, and then the micropore volume of the molecular sieve was determined based on the adsorption isotherm according to the T-plot method, and the pore volume of secondary pores was obtained by subtracting the micropore volume from the total pore volume.

In each of the comparative examples and examples, the surface $SiO_2/Al_2O_3$ molar ratio of the molecular sieve was determined as follows: the percentage by mass of Si and Al atoms on the surface of the molecular sieve was determined by XPS photoelectron spectroscopy, and then the surface $SiO_2/Al_2O_3$ molar ratio of the molecular sieve was calculated. XPS photoelectron spectroscopy was performed on the ESCALab 250 X-ray photoelectron spectrometer of Thermo Scientific Company. The excitation source was monochromated Al Kα X-ray with an energy of 1486.6 eV and a power of 150 W. The penetration energy for narrow scans was 30 eV. The base vacuum at the time of analysis was about $6.5 \times 10^{-10}$ mbar. The binding energy was calibrated in accordance with the C1s peak (284.8 eV) of alkyl carbon or contaminated carbon.

Unless otherwise stated, the reagents used in each of the comparative examples and examples were chemically pure reagents.

The following Examples 1-6 are directed to the rare earth modified Y-type molecular sieve according to the present application and the catalytic cracking catalyst comprising the same.

Example 1

2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m$^3$ of water and stirred evenly at 25° C. Then, 600 L of $RECl_3$ solution (the rare earth concentration calculated on the basis of $RE_2O_3$ in the $RECl_3$ solution was 319 g/L) was added, and stirring was continued for 60 minutes. The mixture was filtered and washed, and the filter cake was sent to a flash drying oven for drying; a rare earth modified Y-type molecular sieve having a normal lattice constant and a reduced sodium oxide content was obtained, which had a sodium oxide content of 7.0% by weight and a lattice constant of 2.471 nm. Then, the molecular sieve was sent to a roaster and roasted at a temperature of 390° C., in 50% steam atmosphere (an atmosphere containing 50% by volume of steam) for 6 hours, then roasted at a temperature of 500° C., in a dry air atmosphere (containing less than 1% by volume of steam) for 2.5 hours to obtain a Y-type molecular sieve having a reduced lattice constant and a water content of less than 1% by weight, of which the lattice constant was 2.455 nm. Then, the Y-type molecular sieve material having a reduced lattice constant was directly sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of the patent application publication No. CN 103787352 A, which is hereby incorporated herein in its entirety, under the following conditions: the weight ratio of $SiCl_4$ to the Y-type molecular sieve was 0.5:1, the feed rate of the molecular sieve was 800 kg/hr, and the reaction temperature was 400° C. The molecular sieve material obtained after the gas phase ultra-stabilization reaction was separated by a gas-solid separator, sent to a secondary exchange tank containing 20 m3 of decationized water added in advance, and stirred evenly. The weight of the molecular sieve material added to the secondary exchange tank was 2000 kg (weight on a dry basis). After that, 0.6 m$^3$ of 10 wt % hydrochloric acid was added, and the reaction mixture was heated to 90° C., and stirred for 60 minutes; then, 140 kg of citric acid was added, and stirring was continued at 90° C. for 60 minutes, followed by filtering, washing, and drying to obtain a modified Y-type molecular sieve product, designated as SZ-1.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of SZ-1.

After SZ-1 was aged in a bare state at 800° C. under atmospheric pressure in an atmosphere of 100 vol % steam for 17 hours, the relative crystallinity of the molecular sieve SZ-1 before and after aging was analyzed by XRD, and the relative crystallinity retention after aging was calculated. The results are shown in Table 2, in which:

$$\text{Relative crystallinity retention} = \frac{\text{Relative crystallinity of aged sample}}{\text{Relative crystallinity of fresh sample}} \times 100\%$$

Example 2

2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m³ of decationized water, and stirred evenly at 90° C. Then, 800 L of $RECl_3$ solution (the rare earth concentration calculated on the basis of $RE_2O_3$ in the $RECl_3$ solution was 319 g/L) was further added, and stirring was continued for 60 minutes. The mixture was filtered and washed, and the filter cake was sent to a flash drying oven for drying to obtain a rare earth modified Y-type molecular sieve having a normal lattice constant and a reduced sodium oxide content, which had a sodium oxide content of 5.5% by weight and a lattice constant of 2.471 nm. Then, the molecular sieve was sent to a roaster and roasted at a temperature (atmosphere temperature) of 450° C. in a 80% steam atmosphere for 5.5 hours; then, the molecular sieve material was passed to a roaster for roasting and drying at a roasting temperature of 500° C. in a dry air atmosphere for a roasting time of 2 hours, where the water content was reduced to less than 1% by weight, to obtain a Y-type molecular sieve having a reduced lattice constant, which had a lattice constant of 2.461 nm. Then, the Y-type molecular sieve material having a reduced lattice constant was directly sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of CN103787352A under the following conditions: the weight ratio of $SiCl_4$ to the Y-type molecular sieve was 0.25:1, the feed rate of the molecular sieve was 800 kg/hr and the reaction temperature was 490° C. The molecular sieve material obtained after the gas phase ultra-stabilization reaction was separated by a gas-solid separator, sent to a secondary exchange tank containing 20 m3 of decationized water added in advance, and stirred evenly. The weight of the molecular sieve material added to the secondary exchange tank was 2000 Kg (weight on a dry basis). After that, 0.9 m³ of 7 wt % sulfuric acid solution was added, and the reaction mixture was heated to 93° C., and stirred for 80 minutes; then, 70 kg of citric acid and 50 kg of tartaric acid were added, and stirring was continued at 93° C. for 70 minutes, followed by filtering, washing and drying, to obtain a modified Y-type molecular sieve product, designated as SZ-2.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of SZ-2.

After SZ-2 was aged in a bare state at 800° C. under atmospheric pressure in an atmosphere of 100 vol % steam for 17 hours, the crystallinity of the molecular sieve SZ-2 before and after aging was analyzed by XRD, and the relative crystallinity retention after aging was calculated. The results are shown in Table 2.

Example 3

2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m³ of decationized water, and stirred evenly at 95° C. Then, 570 L of $RECl_3$ solution (the rare earth concentration calculated on the basis of $RE_2O_3$ in the $RECl_3$ solution was 319 g/L) was further added, and stirring was continued for 60 minutes. Then, the mixture was filtered and washed, and the filter cake was continuously sent to a flash drying oven for drying to obtain a rare earth modified Y-type molecular sieve having a normal lattice constant and a reduced sodium oxide content, which had a sodium oxide content of 7.5% by weight and a lattice constant of 2.471 nm. Then, the molecular sieve was sent to a roaster and roasted at a roasting temperature of 470° C. in an atmosphere containing 70% by volume of steam for 5 hours; then, the molecular sieve material was passed to a roaster for roasting and drying at a roasting temperature of 500° C. in a dry air atmosphere for 1.5 hours, where the water content was reduced to less than 1% by weight, to obtain a Y-type molecular sieve having a reduced lattice constant, which had a lattice constant of 2.458 nm. Then, the Y-type molecular sieve material having a reduced lattice constant was sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of CN103787352A under the following conditions: the weight ratio of $SiCl_4$ to the Y-type molecular sieve was 0.45:1, the feed rated of the molecular sieve was 800 kg/hr and the reaction temperature was 400° C. The molecular sieve material obtained after the gas phase ultra-stabilization reaction was separated by a gas-solid separator, sent to a secondary exchange tank containing 20 m³ of decationized water added in advance, and stirred evenly. The weight of the molecular sieve material added to the secondary exchange tank was 2000 Kg (weight on a dry basis). After that, 1.2 m³ of 5 wt % nitric acid was added slowly, the mixture was heated to 95° C., and stirring was continued for 90 minutes; then, 90 kg of citric acid and 40 kg of oxalic acid were added, and stirring was continued at 93° C. for 70 minutes, followed by filtering, washing, and drying, to obtain a modified Y-type molecular sieve product, designated as SZ-3.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of SZ-3.

After SZ-3 was aged in a bare state at 800° C. under atmospheric pressure in an atmosphere of 100 vol % steam for 17 hours, the crystallinity of the molecular sieve SZ-3 before and after aging was analyzed by XRD, and the relative crystallinity retention after aging was calculated. The results are shown in Table 2.

Comparative Example 1

2000 g of NaY molecular sieve (dry basis) was added to 20 liters of decationized aqueous solution, stirred evenly, and 1000 g of $(NH_4)_2SO_4$ was added thereto, stirred, and heated to 90-95° C. for 1 hour. Then, the mixture was filtered and washed, and the filter cake was dried at 120° C., and then subjected to hydrothermal modification treatment by roasting at a temperature of 650° C. in a 100% steam atmosphere for 5 hours. Then, the resultant was added to 20 liters of decationized aqueous solution, stirred evenly, and 1000 g of $(NH_4)_2SO_4$ was added thereto, stirred, and heated to 90-95° C. for 1 hour. Then, after filtering and washing, the filter cake was dried at 120° C. and then subjected to a second hydrothermal modification treatment by roasting at a temperature of 650° C. in a 100% steam atmosphere for 5 hours, to obtain a hydrothermally ultra-stabilized Y-type molecular sieve free of rare earth that have undergone two stages of ion-exchange and two stages of hydrothermal stabilization, designated as DZ-1.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-1.

After DZ-1 was aged in a bare state at 800° C. under atmospheric pressure in an atmosphere of 100 vol % steam for 17 hours, the crystallinity of the molecular sieve DZ-1 before and after aging was analyzed by XRD, and the relative crystallinity retention after aging was calculated. The results are shown in Table 2.

Comparative Example 2

2000 g of NaY molecular sieve (dry basis) was added to 20 liters of decationized aqueous solution, stirred evenly, and 1000 g of $(NH_4)_2SO_4$ was added thereto, stirred, and heated to 90-95° C. for 1 hour. Then, the mixture was filtered and washed, and the filter cake was dried at 120° C., and then subjected to hydrothermal modification treatment by roasting at a temperature of 650° C. in 100% steam atmosphere for 5 hours. Then, the resultant was added to 20 liters of decationized aqueous solution, stirred evenly, 200 ml of $RE(NO_3)_3$ solution (concentration of 319 g/L on the basis of $RE_2O_3$) and 900 g $(NH_4)_2SO_4$ were added thereto, stirred and heated 90-95° C. for 1 hour. Then, after filtering and washing, the filter cake was dried at 120° C. and then subjected to a second hydrothermal modification treatment by roasting at a temperature of 650° C. in a 100% steam atmosphere for 5 hours, to obtain a hydrothermally ultra-stabilized Y-type molecular sieve containing rare earth that have undergone two stages of ion-exchange and two stages of hydrothermal stabilization, designated as DZ-2.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pore of DZ-2s.

After DZ-2 was aged in a bare state at 800° C. under atmospheric pressure in an atmosphere of 100 vol % steam for 17 hours, the crystallinity of the molecular sieve DZ-2 before and after aging was analyzed by XRD, and the relative crystallinity retention after aging was calculated. The results are shown in Table 2.

Comparative Example 3

2000 kg NaY molecular sieve (dry basis) was added to 20 m³ of water, stirred evenly, 650 L of $RE(NO_3)_3$ solution (concentration of 319 g/L on the basis of $RE_2O_3$) was added thereto, stirred, and heated to 90-95° C. for 1 hour. Then, the mixture was filtered and washed, and the filter cake was sent to a flash roaster for roasting and drying, and the roasting was carried out at a temperature of 500° C. in a dry air atmosphere for a roasting time of 2 hours, so that the water content was reduced to less than 1% by weight. Then, the dried molecular sieve material was sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method described in Example 1 of the patent application publication No. CN103787352A under the following conditions: the weight ratio of $SiCl_4$ to the Y-type molecular sieve was 0.4:1, the feed rate of the molecular sieve was 800 kg/hr and the reaction temperature was 580° C. The molecular sieve material obtained after the gas phase ultra-stabilization reaction was separated by a gas-solid separator, sent to a secondary exchange tank containing 20 m³ of decationized water added in advance, and stirred evenly. The weight of the molecular sieve material added to the secondary exchange tank was 2000 kg (weight on a dry basis). After that, 1.2 m³ of 5 wt % nitric acid was added slowly, heated to 95° C., and stirring was continued for 90 minutes; then, 90 kg of citric acid and 40 kg of oxalic acid were added, and stirring was continued at 93° C. for 70 minutes, followed by filtering, washing, and drying to obtain a modified Y-type molecular sieve product, designated as DZ-3.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-3.

After DZ-3 was aged in a bare state at 800° C. under atmospheric pressure in an atmosphere of 100 vol % steam for 17 hours, the crystallinity of the molecular sieve DZ-3 before and after aging was analyzed by XRD, and the relative crystallinity retention after aging was calculated. The results are shown in Table 2.

Comparative Example 4

2000 kg (weight on a dry basis) NaY zeolite having a framework $SiO_2/Al_2O_3$ of 4.6 was added to a primary exchange tank containing 20 m³ of decationized water and stirred evenly at 95° C. Then, 570 L of $RECl_3$ solution (the rare earth concentration calculated on the basis of $RE_2O_3$ in the $RECl_3$ solution was 319 g/L) was added, and stirring was continued for 60 minutes. The mixture was filtered and washed, and the filter cake was continuously sent to a flash drying oven for drying to obtain a rare earth modified Y-type molecular sieve having a normal lattice constant and a reduced sodium oxide content, which had a sodium oxide content of 7.5% by weight and a lattice constant of 2.471 nm. Then, the molecular sieve was sent to a roaster for hydrothermal modification by roasting at a temperature of 650° C. in 100 vol % steam atmosphere for 5 hours; then, the molecular sieve material was passed to a roaster for roasting and drying at a roasting temperature of 500° C. in a dry air atmosphere for a roasting time of 1.5 hours, so that the water content was reduced to less than 1% by weight. Then, the Y-type molecular sieve material having a reduced lattice constant was sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of CN103787352A under the following conditions: the weight ratio of $SiCl_4$ to the Y-type molecular sieve was 0.45:1, the feed rate of the molecular sieve was 800 kg/hr and the reaction temperature was 400° C. The molecular sieve material obtained after the gas phase ultra-stabilization reaction was separated by a gas-solid separator, sent to a secondary exchange tank containing 20 $m^3$ of decationized water added in advance, and stirred evenly. The weight of the molecular sieve material added to the secondary exchange tank was 2000 Kg (weight on a dry basis). After that, 1.2 $m^3$ of 5 wt % nitric acid was added slowly, heated to 95° C., and stirring was continued for 90 minutes; then, 90 kg of citric acid and 40 kg of oxalic acid were added, and stirring was continued at 93° C. for 70 minutes, followed by filtering, washing, and drying to obtain a modified Y-type molecular sieve product, designated as DZ-4.

Table 1 shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-4.

After DZ-4 was aged in a bare state at 800° C. under atmospheric pressure in an atmosphere of 100 vol % steam for 17 hours, the crystallinity of the molecular sieve DZ-4 before and after aging was analyzed by XRD, and the relative crystallinity retention after aging was calculated. The results are shown in Table 2.

Comparative Example 5

2000 g of NaY molecular sieve (on a dry basis) was added to 20 liters of decationized aqueous solution, stirred evenly, 600 ml of $RE(NO_3)_3$ solution (concentration of the rare earth solution was 319 g/L on the basis of $RE_2O_3$) was added thereto, stirred, and heated to to 90-95° C. for 1 hour. The mixture was filtered and washed, and the filter cake was dried at 120° C. to obtain a Y-type molecular sieve having a lattice constant of 2.471 nm, a sodium oxide content of 7.0% by weight, and a rare earth content of 8.8% by weight on the basis of $RE_2O_3$. Then, the molecular sieve was roasted at a temperature of 390° C. in an atmosphere containing 50% by volume of steam and 50% by volume of air for 6 hours, to obtain a Y-type molecular sieve having a lattice constant of 2.455 nm, followed by drying to obtain a water content of less than 1% by weight. Then, a gas phase ultra-stabilization reaction process and a subsequent exhaust gas absorption process were carried in accordance with the method disclosed in Example 1 of the patent applicatoin publication No. CN103787352A, in which a gaseous $SiCl_4$ vaporied by heat was introduced at a weight ratio of $SiCl_4$ to the Y-type molecular sieve (dry basis) of 0.5:1, and the reaction was conducted for 2 hours at a temperature of 400° C. Then, the resultant was washed with 20 liters of decationized water and then filtered to obtain a modified Y-type molecular sieve, designated as DZ-5, of which the physicochemical properties are shown in Table 1.

After DZ-5 was aged in a bare state at 800° C. under atmospheric pressure in an atmosphere of 100 vol % steam for 17 hours, the relative crystallinity of the molecular sieve DZ-5 before and after aging was analyzed by XRD, and the relative crystallinity retention after aging was calculated. The results are shown in Table 2.

Example 4-6

Molecular sieve, kaolin, pseudo-boehmite and aluminum sol were mixed with water at a weight ratio (on a dry basis) of molecular sieve:kaolin:pseudo-boehmite:aluminum sol of 30:38:22:10, slurried, and then spray-dried at 450° C. to obtain a spherical catalytic cracking catalyst. Catalysts SC-1, SC-2 and SC-3 were prepared using the modified Y-type molecular sieves SZ-1, SZ-2 and SZ-3 obtained in Examples 1-3, respectively. The main properties of the catalysts are listed in Table 3.

Comparative Examples 6-10

Reference catalysts DC-1, DC-2, DC-3, DC-4 and DC-5 were prepared using the molecular sieves DZ-1, DZ-2, DZ-3, DZ-4 and DZ-5 obtained in Comparative Examples 1-5, respectively, in accordance with the method for the preparation of catalytic cracking catalysts as described in Examples 4-6 and the material ratio used therein. The main properties of the catalysts are listed in Table 3.

Evaluation of Micro-Activity for Light Oils:

The micro-activity for light oils of each catalyst was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235–337° C. The composition of the product was analyzed by gas chromatography, and the micro-activity for light oils was calculated based on the composition of the product.

Micro-activity for light oils (MA)=(production of gasoline below 216° C.+gas production+coke production)/total amount of feed×100%.

The micro-activities of the catalysts obtained in Examples 4 to 6 and Comparative Examples 6 to 10 were evaluated, respectively, in accordance with the method as described above, and the results are shown in Table 3.

Evaluation of Cracking Performance for Heavy Oils:

The catalyst was first aged at 800° C. in 100% steam atmosphere for 17 hours, and then its catalytic cracking performance was evaluated on an ACE (fixed fluidized bed) unit. The feedstock oil was WuHan-mixed-III-2007 (properties shown in Table 4), cracked gas and product oils were collected separately and analyzed by gas chromatography. The catalyst loading was 9 g, the reaction temperature was 500° C., the weight hourly space velocity was 16 $h^{-1}$, and the catalyst-to-oil weight ratio was shown in Table 5.

In the table, conversion=gasoline yield+liquefied gas yield+dry gas yield+coke yield Light oil yield=gasoline yield+diesel oil yield Liquid yield=liquefied gas+gasoline+diesel Coke selectivity=coke yield/conversion.

The catalytic cracking performance of the catalysts obtained in Examples 4 to 6 and Comparative Examples 6 to 10 were evaluated, respectively, in accordance with the method as described above, and the results are shown in Table 5.

TABLE 1

Properties of the modified Y-type molecular sieves

| | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Name of molecular sieve | SZ-1 | SZ-2 | SZ-3 | DZ-1 | DZ-2 | DZ-3 | DZ-4 | DZ5 |
| $RE_2O_3$ content/wt % | 5.7 | 8.6 | 6.4 | 0 | 2.7 | 6.2 | 6.0 | 5.7 |
| $Na_2O$ content/wt % | 0.26 | 0.29 | 0.22 | 1.3 | 1.5 | 0.79 | 0.18 | 0.51 |
| Total $SiO_2/Al_2O_3$ molar ratio | 10.84 | 8.22 | 9.98 | 4.94 | 4.85 | 10.67 | 11.12 | 9.74 |
| Framework $SiO_2/Al_2O_3$ molar ratio | 11.95 | 8.79 | 10.87 | 10.39 | 7.83 | 11.39 | 12.56 | 11.95 |
| Surface $SiO_2/Al_2O_3$ molar ratio/Framework $SiO_2/Al_2O_3$ molar ratio | <1 | <1 | <1 | <1 | <1 | <1 | <1 | <1 |
| Framework aluminum/Total aluminum × 100 | 90.7 | 93.5 | 91.8 | 47.59 | 61.99 | 93.65 | 88.5 | 81.5 |
| Non-framework aluminum/Total aluminum × 100 | 9.3 | 6.5 | 8.2 | 52.41 | 38.01 | 6.35 | 11.5 | 18.5 |
| Lattice constant/nm | 2.443 | 2.45 | 2.445 | 2.446 | 2.453 | 2.444 | 2.442 | 2.443 |
| crystallinity/% | 71.5 | 72.3 | 75.8 | 60.1 | 59.5 | 58.3 | 56.8 | 63.2 |
| Lattice collapse temperature/° C. | 1081 | 1064 | 1075 | 1038 | 1020 | 1047 | 1051 | 1072 |
| Specific surface area/($m^2$/g) | 648 | 669 | 654 | 615 | 598 | 645 | 625 | 635 |
| Total pore volume/(mL/g) | 0.415 | 0.398 | 0.387 | 0.349 | 0.322 | 0.329 | 0.366 | 0.355 |
| Micropore volume/(mL/g) | 0.259 | 0.280 | 0.275 | 0.255 | 0.249 | 0.309 | 0.247 | 0.281 |
| Pore volume of secondary pores/(mL/g) | 0.156 | 0.118 | 0.112 | 0.094 | 0.073 | 0.020 | 0.119 | 0.074 |
| Percentage of pore volume of secondary pores having a pore size of 2.0-100 nm to total pore volume/% | 37.59 | 29.65 | 28.94 | 26.93 | 22.67 | 6.08 | 32.51 | 20.85 |
| Percentage of pore volume of secondary pores of 8.0-100 nm to total pore volume of secondary pores (2.0-100 nm)/% | 75.21 | 68.15 | 59.81 | 18.35 | 16.24 | 1.15 | 65.92 | 15.82 |
| B acid/L acid (total acid conent ratio) | 3.58 | 4.55 | 4.02 | 0.75 | 2.15 | 3.79 | 3.05 | 2.72 |

It can be seen from Table 1 that the highly stable modified Y-type molecular sieve provided in the present application has a low sodium oxide content, a relatively lower non-framework aluminum content at a relatively higher silica-alumina ratio, a relatively higher percentage of the pore volume of secondary pores having a pore size of 2.0-100 nm to the total pore volume, a relatively higher B acid/L acid ratio (the ratio of total B content to total L acid content), a relatively higher crystallinity especially when the molecular sieve has a relatively smaller lattice constant and a relatively higher rare earth content, a high lattice collapse temperature, and a high thermal stability.

TABLE 2

Aging test of the modified Y-type molecular sieves

| Example No. | Name of molecular sieve | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Ex. 1 | SZ-1 | 71.5 | 41.84 | 58.52 |
| Ex. 2 | SZ-2 | 72.3 | 38.07 | 52.65 |

TABLE 2-continued

Aging test of the modified Y-type molecular sieves

| Example No. | Name of molecular sieve | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Ex. 3 | SZ-3 | 75.8 | 45.02 | 59.39 |
| Comp. Ex. 1 | DZ-1 | 60.1 | 4.30 | 7.15 |
| Comp. Ex. 2 | DZ-2 | 59.5 | 5.90 | 9.92 |
| Comp. Ex. 3 | DZ-3 | 58.3 | 21.25 | 36.45 |
| Comp. Ex. 4 | DZ-4 | 56.8 | 20.31 | 35.75 |
| Comp. Ex. 5 | DZ-5 | 63.2 | 27.94 | 44.21 |

It can be seen from Table 2 that the modified Y-type molecular sieve provided in the present application shows a relatively higher relative crystallinity retention after being aged in a bare state under severe conditions at 800° C. for 17 hours, indicating that the modified Y-type molecular sieve provided in the present application has a higher hydrothermal stability.

TABLE 3

Properties of the catalytic cracking catalysts

| | Ex. 4 | Ex. 5 | Ex. 6 | Comp. Ex. 6 | Comp. Ex. 7 | Comp. Ex. 8 | Comp. Ex. 9 | Comp. Ex. 10 |
|---|---|---|---|---|---|---|---|---|
| Name of catalyst | SC-1 | SC-2 | SC-3 | DC-1 | DC-2 | DC-3 | DC-4 | DC-5 |
| Name of molecular sieve | SZ-1 | SZ-2 | SZ-3 | DZ-1 | DZ-2 | DZ-3 | DZ-4 | DZ-5 |
| $Al_2O_3$ content/wt % | 47.5 | 47.9 | 48.4 | 49.5 | 51.8 | 50.5 | 50.8 | 51.1 |
| $Na_2O$ content/wt % | 0.02 | 0.03 | 0.04 | 0.14 | 0.16 | 0.18 | 0.12 | 0.14 |
| Loss on ignition/wt % | 11.3 | 11.2 | 11.5 | 11.5 | 11.9 | 11.4 | 11.6 | 11.6 |
| Pore volume/(mL·$g^{-1}$) | 0.47 | 0.45 | 0.44 | 0.36 | 0.36 | 0.38 | 0.39 | 0.38 |
| Specific surface area/($m^2$·$g^{-1}$) | 283 | 285 | 291 | 264 | 271 | 287 | 275 | 274 |
| Abrasion index/(%·$h^{-1}$) | 1.0 | 1.0 | 1.1 | 1.2 | 1.5 | 1.3 | 1.1 | 1.4 |
| Apparent bulk density/(g·$mL^{-1}$) | 0.71 | 0.72 | 0.73 | 0.73 | 0.73 | 0.72 | 0.72 | 0.74 |
| Micro-activity (800, 4 h)/% | 86 | 89 | 85 | 41 | 52 | 81 | 80 | 81 |
| Sieve size distribution/wt % | | | | | | | | |
| 0-20 μm | 3.5 | 3.2 | 3.4 | 3.3 | 3.3 | 2.9 | 2.8 | 3.1 |
| 0-40 μm | 17.5 | 17.6 | 16.5 | 18.7 | 18.7 | 16.5 | 16.8 | 17.2 |
| 0-149 μm | 91.8 | 92.1 | 91.7 | 92.4 | 92.4 | 91.5 | 91.6 | 92.2 |
| Average pore size (μm) | 71.5 | 72.8 | 70.5 | 69.7 | 69.7 | 72.9 | 71.1 | 71.3 |

TABLE 4

Properties of feedstock oil used in the ACE evaluation

| Name | WuHan-mixed-III-2007 |
|---|---|
| Density (20° C.)/(g·$cm^{-3}$) | 0.9104 |
| Viscosity (80° C.)/($mm^2$/s) | 19.24 |
| Viscosity (100° C.)/($mm^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Colloid/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |

TABLE 4-continued

Properties of feedstock oil used in the ACE evaluation

| Name | WuHan-mixed-III-2007 |
|---|---|
| 30% | 407 |
| 50% | 451 |
| 70% | 494 |
| 81.5% | 540 |

TABLE 5

Catalytic cracking performances of the catalytic cracking catalysts

| | Example No. | | | | | | | |
|---|---|---|---|---|---|---|---|---|
| | Ex. 4 | Ex. 5 | Ex. 6 | Comp. Ex. 6 | Comp. Ex. 7 | Comp. Ex. 8 | Comp. Ex. 9 | Comp. Ex. 10 |
| Name of catalyst | SC-1 | SC-2 | SC-3 | DC-1 | DC-2 | DC-3 | DC-4 | DC5 |
| Name of molecular sieve | SZ-1 | SZ-2 | SZ-3 | DZ-1 | DZ-2 | DZ-3 | DZ-4 | DZ5 |
| Catalyst-to-oil ratio (weight ratio) | 5 | 5 | 5 | 9 | 8 | 5 | 5 | 5 |
| Product distribution/wt % | | | | | | | | |
| Dry gas | 1.29 | 1.38 | 1.31 | 1.55 | 1.48 | 1.47 | 1.41 | 1.35 |
| Liquefied gas | 17.01 | 16.79 | 16.75 | 16.86 | 15.33 | 16.31 | 16.55 | 16.93 |
| Coke | 3.65 | 3.73 | 4.01 | 8.33 | 7.61 | 6.19 | 4.81 | 4.72 |
| Gasoline | 54.95 | 55.45 | 54.38 | 38.55 | 43.91 | 51.19 | 53.62 | 52.83 |
| Diesel oil | 16.58 | 16.52 | 16.64 | 20.17 | 19.25 | 16.67 | 16.54 | 16.96 |
| Heavy oils | 6.52 | 6.13 | 6.91 | 14.54 | 12.42 | 8.17 | 7.07 | 7.21 |
| Total | 100 | 100 | 100 | 100 | 100 | 100 | 100 | 100 |
| Conversion/wt % | 76.9 | 77.35 | 76.45 | 65.29 | 68.33 | 75.16 | 76.39 | 75.83 |
| Coke selectivity/wt % | 4.75 | 4.82 | 5.25 | 12.76 | 11.14 | 8.24 | 6.30 | 6.22 |
| Light oil yield/wt % | 71.53 | 71.97 | 71.02 | 58.72 | 63.16 | 67.86 | 70.16 | 69.79 |
| Total liquid yield/wt % | 88.54 | 88.76 | 87.77 | 75.58 | 78.49 | 84.17 | 86.71 | 86.72 |

It can be seen from Table 5 that the catalysts obtained using the molecular sieve prepared according to the present application as an active component show a relatively higher conversion, a relatively higher light oil yield and total liquid yield, and excellent coke selectivity. It can be seen that the modified Y-type molecular sieve provided in the present application has a very high hydrothermal stability, a significantly lower coke selectivity, a significantly higher liquid yield, a significantly higher light oil yield, an improved gasoline yield, and a higher conversion activity for heavy oils.

The following Examples 1P-9P are directed to the rare earth and phosphorus modified Y-type molecular sieves according to the present application and catalytic cracking catalysts comprising the same.

Example 1P 2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m³ of water and stirred evently at 25° C. Then, 600 L of $RECl_3$ solution (the rare earth concentration calculated on the basis of $RE_2O_3$ in the $RECl_3$ solution was 319 g/L) was further added, and stirring was continued for 60 minutes. Then, the mixture was filtered and washed, and the filter cake was continuously sent to a flash drying oven for drying to obtain a rare earth modified Y-type molecular sieve having a normal lattice constant and a reduced sodium oxide content, which had a sodium oxide content of 7.0% by weight and a lattice constant of 2.471 nm. Then, the molecular sieve was sent to a roaster for modification, and the roasting was carried out at an atmosphere temperature controlled at 390° C. in 50% steam atmosphere (an atmosphere containing 50 vol % steam) for 6 hours; then, the molecular sieve material was introduced into a roaster for roasting and drying, and the roasting was carried out at an atmosphere temperature of 500° C. in a dry air atmosphere (steam content of less than 1% by volume) for 2.5 hours, so that the water content was reduced to less than 1% by weight, and a Y-type molecular sieve having a reduced lattice constant was obtained, which had a lattice constant of 2.455 nm. Then, the Y-type molecular sieve material having a reduced lattice constant was directly sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method described in Example 1 of the patent application publication No. CN103787352A under the following conditions: the weight ratio of $SiCl_4$ to the Y-type molecular sieve was 0.5:1, the feed rate of the molecular sieve was 800 kg/hr and the reaction temperature was 400° C. The molecular sieve material obtained after the gas phase ultra-stabilization reaction was separated by a gas-solid separator, sent to a secondary exchange tank containing 20 m³ of decationized water added in advance, and stirred evenly. The weight of the molecular sieve material added to the secondary exchange tank was 2000 kg (weight on a dry basis). After that, 0.6 m³ of 10 wt % hydrochloric acid was added slowly, the mixture was heated to 90° C., and stirring was continued for 60 minutes; then, 140 kg of citric acid was added, and stirring was continued at 90° C. for 60 minutes, followed by filtering and washing. Then, the molecular sieve cake was directly added to an exchange liquid containing ammonium phosphate in such an amount that the weight ratio of phosphorus (calculated on the basis of $P_2O_5$) to the molecular sieve of 0.04, and the weight ratio of water to the molecular sieve was 2.5. The ion-exchange reaction was carried out at 50° C. for 60 minutes, followed by filtering and washing, to obtain a rare earth and phosphorus modified Y-type molecular sieve rich in secondary pores, designated as SZ-1 P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (2-100 nm), and total pore volume of secondary pores of SZ-1P.

After the SZ-1P was aged in a bare state at 800° C. under atmospheric pressure in an atmosphere of 100 vol % steam for 17 hours, the relative crystallinity of the molecular sieve SZ-1P before and after aging was analyzed by XRD, and the relative crystallinity retention after aging was calculated. The results are shown in Table 2P.

Example 2P 2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m³ of decationized water, and stirred evenly at 90° C. Then, 800 L of $RECl_3$ solution (the rare earth concentration calculated on the basis of $RE_2O_3$ in the $RECl_3$ solution was 319 g/L) was further added, and stirring was continued for 60 minutes. The mixture was filtered and washed, and the filter cake was sent to a flash drying oven for drying to obtain a rare earth modified Y-type molecular sieve having a normal lattice constant and a reduced sodium oxide content, which had a sodium oxide content of 5.5% by weight and a lattice constant of 2.471 nm. Then, the molecular sieve was sent to a roaster, and roasted at a temperature (atmosphere temperature) of 450° C. in an 80% steam atmosphere for 5.5 hours; then, the molecular sieve material was passed to a roaster for roasting and drying, and the roasting was carried out at a temperature controlled at 500° C. in a dry air atmosphere for a roasting time of 2 hours, so that the water content of the molecular sieve was reduced to less than 1% by weight, and a Y-type molecular sieve having a reduced lattice constant was obtained, which had a lattice constant of 2.461 nm. Then, the Y-type molecular sieve material having a reduced lattice constant was directly sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of CN103787352A under the following conditions: the weight ratio of $SiCl_4$ to the Y-type molecular sieve was 0.25:1, the feed rate of the molecular sieve was 800 kg/hr and the reaction temperature was 490° C. The molecular sieve material obtained after the gas phase ultra-stabilization reaction was separated by a gas-solid separator, sent to a secondary exchange tank containing 20 m³ of decationized water added in advance, and stirred evenly. The weight of the molecular sieve material added to the secondary exchange tank was 2000 Kg (weight on a dry basis). After that, 0.9 m³ of 7 wt % sulfuric acid solution was added slowly, the mixture was heated to 93° C., followed by stirring for 80 minutes; then, 70 kg of citric acid and 50 kg of tartaric acid were added, and stirring was continued at 93° C. for 70 minutes, followed by filtering and washing. Then, the molecular sieve cake was directly added to an exchange liquid containing diammonium hydrogen phosphate in such an amount that the weight ratio of phosphorus (calculated on the basis of $P_2O_5$) to the molecular sieve was 0.03, and the weight ratio of water to the molecular sieve was 3.0. The ion-exchange reaction was carried out at 60° C. for 50 minutes, followed by filtering and washing, to obtain a rare earth and phosphorus modified Y-type molecular sieve rich in secondary pores, designated as SZ-2P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of SZ-2P.

After SZ-2P was aged in a bare state at 800° C. under atmospheric pressure in an atmosphere of 100 vol % steam for 17 hours, the crystallinity of the molecular sieve SZ-2P before and after aging was analyzed by XRD, and the relative crystallinity retention after aging was calculated. The results are shown in Table 2P.

Example 3P 2000 kg (weight on a dry basis) NaY zeolite with a framework $SiO_2/Al_2O_3$ ratio of 4.6 (sodium oxide content 13.5 wt %, produced by Qilu Branch of Sinopec Catalyst Co., Ltd.) was added to a primary exchange tank containing 20 m³ of decationized water, and stirred evenly at 95° C., then 570 L of $RECl_3$ solution (the rare earth concentration in $RECl_3$ solution was 319 g/L on the basis of $RE_2O_3$) was further added, and stirring was continued for 60 minutes. Then, the mixture was filtered and washed, and the filter cake was continuously sent to a flash drying oven for drying to obtain a rare earth modified Y-type molecular sieve having a normal lattice constant and a reduced sodium oxide content, which had a sodium oxide content of 7.5% by weight and a lattice constant of 2.471 nm. Then, the molecular sieve was sent to a roaster for hydrothermal modification, in which the roasting was carried out at a roasting temperature of 470° C. in an atmosphere containing 70% by volume of steam for 7 hours; then, the molecular sieve material was passed to a roaster for roasting and drying, and the roasting was carried out at a temperature controlled at 500° C. in a dry air atmosphere for a roasting time of 1.5 hours, so that the water content was reduced to less than 1% by weight, and a Y-type molecular sieve having a reduced lattice constant was obtained, which had a lattice constant of 2.458 nm. Then, the Y-type molecular sieve material having a reduced lattice constant was sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method disclosed in Example 1 of CN103787352A under the following conditions: the weight ratio of $SiCl_4$ to the Y-type molecular sieve was 0.45:1, the feed rated of the molecular sieve was 800 kg/hr and the reaction temperature was 400° C. The molecular sieve material obtained after the gas phase ultra-stabilization reaction was separated by a gas-solid separator, sent to a secondary exchange tank containing 20 m³ of decationized water added in advance, and stirred evenly. The weight of the molecular sieve material added to the secondary exchange tank was 2000 Kg (weight on a dry basis). After that, 1.2 m³ of 5 wt % nitric acid solution was added slowly, the mixture was heated to 95° C., and stirred for 90 minutes; then, 90 kg of citric acid and 40 kg of oxalic acid were added, and the mixture was stirred at 93° C. for 70 minutes, followed by filtering and washing. The molecular sieve cake was directly added to an exchange liquid containing ammonium phosphate in such an amount that the weight ratio of phosphorus (calculated on the basis of $P_2O_5$) to the molecular sieve was 0.015, and the weight ratio of water to the molecular sieve was 2.8. The ion-exchange reaction was carried out at 70° C. for 30 minutes, followed by filtering and washing, to obtain a rare earth and phosphorus modified Y-type molecular sieve rich in secondary pores, designated as SZ-3P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of SZ-3P.

After SZ-3P was aged in a bare state at 800° C. under atmospheric pressure in an atmosphere of 100 vol % steam for 17 hours, the crystallinity of the molecular sieve SZ-3P before and after aging was analyzed by XRD, and the relative crystallinity retention after aging was calculated. The results are shown in Table 2P.

Comparative Example 1P

A hydrothermally ultra-stabilized Y-type molecular sieve free of rare earth was prepared in accordance with Comparative Example 1, and was designated as DZ-1P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-1P.

After DZ-1P was aged in a bare state at 800° C. under atmospheric pressure in an atmosphere of 100 vol % steam for 17 hours, the crystallinity of the molecular sieve DZ-1P before and after aging was analyzed by XRD, and the relative crystallinity retention after aging was calculated. The results are shown in Table 2P.

Comparative Example 2 P

A hydrothermally ultra-stabilized Y-type molecular sieve containing rare earth was prepared in accordance with Comparative Example 2, and was designated as DZ-2P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-2P.

After DZ-2P was aged in a bare state at 800° C. under atmospheric pressure in an atmosphere of 100 vol % steam for 17 hours, the crystallinity of the molecular sieve DZ-2P before and after aging was analyzed by XRD, and the relative crystallinity retention after aging was calculated. The results are shown in Table 2P.

Comparative Example 3P 2000 kg NaY molecular sieve (dry basis) was added to 20 $m^3$ of water, stirred evenly, 650 L of $RE(NO_3)_3$ solution (concentration of 319 g/L on the basis of $RE_2O_3$) was added thereto, stirred, and heated to 90-95° C. for 1 hour. Then, the mixture was filtered and washed, and the filter cake was continuously fed to a flash roaster for roasting and drying, and the roasting was carried out at a temperature of 500° C. in a dry air atmosphere for a roasting time of 2 hours, so that the water content was reduced to less than 1% by weight. Then, the dried molecular sieve material was sent to a continuous gas phase ultra-stabilization reactor for gas phase ultra-stabilization reaction. The gas phase ultra-stabilization reaction process of the molecular sieve in the continuous gas phase ultra-stabilization reactor and the subsequent exhaust gas absorption process were carried out in accordance with the method described in Example 1 of the patent application publication No. CN103787352A under the following conditions: the weight ratio of $SiCl_4$ to the Y-type molecular sieve was 0.4:1, the feed rate of the molecular sieve was 800 kg/hr and the reaction temperature was 580° C. The molecular sieve material obtained after the gas phase ultra-stabilization reaction was separated by a gas-solid separator, sent to a secondary exchange tank containing 20 $m^3$ of water added in advance, and stirred evenly. The weight of the molecular sieve material added to the secondary exchange tank was 2000 kg (weight on a dry basis). After that, 1.2 $m^3$ of 5 wt % nitric acid was added slowly, the mixture was heated to 95° C., and stirring was continued for 90 minutes; then, 90 kg of citric acid and 40 kg of oxalic acid were added, and stirring was continued at 93° C. for 70 minutes, followed by filtering and washing. The molecular sieve cake was directly added to an exchange liquid containing ammonium phosphate in such an amount that the weight ratio of phosphorus (calculated on the basis of $P_2O_5$) to the molecular sieve was 0.015, and the weight ratio of water to the molecular sieve was 2.8. The ion-exchange reaction was carried out at 70° C. for 30 minutes, followed by filtering and washing, to obtain an ultra-stable rear earth modified Y-type molecular sieve and phosphorus, designated as DZ-3P.

Table 1P shows the composition, lattice constant, relative crystallinity, framework silica-alumina ratio, lattice collapse temperature, specific surface area, percentage of secondary pores having a large pore size (pore size 8-100 nm) to total secondary pores (pore size 2-100 nm), and total pore volume of secondary pores of DZ-3P.

After DZ-3P was aged in a bare state at 800° C. under atmospheric pressure in an atmosphere of 100 vol % steam for 17 hours, the crystallinity of the molecular sieve DZ-3P before and after aging was analyzed by XRD, and the relative crystallinity retention after aging was calculated. The results are shown in Table 2P.

Examples 4P-6P

Examples 4P-6P illustrate the catalytic cracking activity and stability of the modified Y-type molecular sieve according to the present application obtained in Examples 1P-3P.

Catalyst designated as SC-1P, SC-2P and SC-3P were prepared using the modified Y-type molecular sieves SZ-1P, SZ-2P and SZ-3P obtained in Examples 1P-3P, respectively. After the catalysts were aged at 800° C. in 100% steam atmosphere for 4 hours or 17 hours, the micro-activity for light oils of the catalysts was evaluated, and the results are shown in Table 3P.

Preparation of the Catalysts:

714.5 g of an aluminum sol having an alumina content of 21% by weight was added to 1565.5 g of decationized water, stirring was started, and 2763 g of kaolin having a solid content of 76% by weight was added and dispersed for 60 minutes. 2049 g of pseudo-boehmite having an alumina content of 61% by weight was added to 8146 g of decationized water, and 210 ml of 36% hydrochloric acid was added under stirring. After acidification for 60 minutes, the dispersed kaolin slurry was added, then 1500 g (dry basis) of finely ground modified Y-type molecular sieve was added, and strried evenly, followed by spray drying, washing, and drying to obtain the catalyst. The catalyst thus obtained comprised 30% by weight of the modified Y-type molecular sieve, 42% by weight of kaolin, 25% by weight of pseudo-boehmite and 3% by weight of aluminum sol.

Method for Evaluation of Micro-Activity for Light Oils:

The micro-activity for light oils of each catalyst was evaluated according to the standard method of RIPP 92-90 (see "Petrochemical Analysis Methods (RIPP Test Methods)", edited by Cuiding YANG et al., Science Press, September 1990, First Edition, pp. 263-268), in which the catalyst loading was 5.0 g, the reaction temperature was 460° C., and the feedstock oil was Dagang light diesel oil having a distillation range of 235–337° C. The composition of the product was analyzed by gas chromatography, and the micro-activity for light oils was calculated based on the composition of the product.

Micro-activity for light oils (MA)=(production of gasoline below 216° C.+gas production+coke production)/total amount of feed×100%.

Comparative Examples 4P-6P

Comparative Examples 4P-6P illustrate the catalytic cracking activity and stability of the ultra-stable Y-type molecular sieve obtained in Comparative Examples 1P-3P.

The ultra-stable Y-type molecular sieves DZ-1P, DZ-2P and DZ-3P obtained in Comparative Examples 1P-3P were mixed, respectively, with pseudo-boehmite, kaolin, water and aluminum sol, and spray dried to obtain microsphere catalysts, in accordance with the method for preparing the catalyst as described in Examples 4P-6P, with the material ratio of each catalyst being the same as that of Examples 4P-6P, and the content of the ultra-stable Y-type molecular sieve in the catalyst being 30% by weight. The catalysts were respectively designated as DC-1P, DC-2P and DC-3P. After the catalysts were aged at 800° C. in 100% steam atmosphere for 4 hours or 17 hours, their micro-activities for light oils were evaluated. The evaluation method is the same as that described in Examples 4P-6P, and the results are shown in Table 3P.

Examples 7P-9P

Examples 7P-9P illustrate the catalytic cracking performance of the modified Y-type molecular sieve according to the present application obtained in Examples 1P-3P.

The catalysts SC-1P, SC-2P, SC-3P were aged at 800° C. in 100% steam atmosphere for 17 hours, and their catalytic cracking performances were evaluated on a small fixed fluidized bed reactor (ACE). Cracking gas and product oils were collected separately and analyzed by gas chromatography. The catalyst loading was 9 g, the reaction temperature was 500° C., the weight hourly space velocity was 16 h$^{-1}$, and the catalyst-to-oil weight ratio was shown in Table 5P. The properties of the feedstock used in the ACE test are shown in Table 4P, and the results are shown in Table 5P.

Comparative Examples 7P-9P

Comparative Examples 7P-9P illustrate the catalytic cracking performance of the ultra-stable Y-type molecular sieve obtained in Comparative Examples 1P-3P.

The catalysts DC-1P, DC-2P and DC-3P were aged at 800° C. in 100% steam atmosphere for 17 hours, and their catalytic cracking performances were evaluated on a small fixed fluidized bed reactor (ACE). The evaluation method is the same as that described in Examples 7P-9P. The properties of the feedstock used in the ACE test are shown in Table 4P, and the results are shown in Table 5P.

TABLE 1P

Properties of the modified Y-type molecular sieves

| | Ex. 1P | Ex. 2P | Ex. 3P | Comp. Ex. 1P | Comp. Ex. 2P | Comp. Ex. 3P |
|---|---|---|---|---|---|---|
| Name of molecular sieve | SZ-1 P | SZ-2 P | SZ-3 P | DZ-1 P | DZ-2 P | DZ-3 P |
| RE$_2$O$_3$ content/wt % | 5.6 | 8.5 | 6.3 | 0 | 2.7 | 6.2 |
| Na$_2$O content/wt % | 0.09 | 0.14 | 0.12 | 1.3 | 1.5 | 0.79 |
| P$_2$O$_5$ content/wt % | 3.55 | 2.89 | 1.38 | 0 | 0 | 1.38 |
| Total SiO$_2$/Al$_2$O$_3$ molar ratio | 10.84 | 8.22 | 9.98 | 4.94 | 4.85 | 10.67 |
| Framework SiO$_2$/Al$_2$O$_3$ molar ratio | 11.95 | 8.79 | 10.87 | 10.39 | 7.83 | 11.39 |
| Framework aluminum/Total aluminum × 100 | 90.7 | 93.5 | 91.8 | 47.59 | 61.99 | 93.65 |
| Non-framework aluminum/Total aluminum × 100 | 9.3 | 6.5 | 8.2 | 52.41 | 38.01 | 6.35 |
| Lattice constant/nm | 2.443 | 2.45 | 2.445 | 2.446 | 2.453 | 2.444 |
| crystallinity/% | 70.4 | 71.8 | 75.4 | 60.1 | 59.5 | 58.1 |
| Lattice collapse temperature/° C. | 1082 | 1065 | 1077 | 1038 | 1020 | 1047 |
| Specific surface area/(m$^2$/g) | 646 | 667 | 654 | 615 | 598 | 645 |
| Total pore volume/(mL/g) | 0.413 | 0.395 | 0.384 | 0.349 | 0.322 | 0.329 |
| Micropore volume/(mL/g) | 0.258 | 0.278 | 0.273 | 0.255 | 0.249 | 0.309 |
| Pore volume of secondary pores having a pore size of 2.0-100 nm/(mL/g) | 0.155 | 0.117 | 0.111 | 0.094 | 0.073 | 0.020 |

TABLE 1P-continued

Properties of the modified Y-type molecular sieves

| | Example No. | | | | | |
|---|---|---|---|---|---|---|
| | Ex. 1P | Ex. 2P | Ex. 3P | Comp. Ex. 1P | Comp. Ex. 2P | Comp. Ex. 3P |
| Percentage of pore volume of secondary pores having a pore size of 2.0-100 nm to total pore volume/% | 37.53 | 29.62 | 28.90 | 26.93 | 22.67 | 6.08 |
| Percentage of pore volume of secondary pores of 8.0-100 nm to total pore volume of secondary pores (2.0-100 nm)/% | 75.21 | 68.15 | 59.81 | 18.35 | 16.24 | 1.15 |
| B acid/L acid (total acid conent ratio) | 3.58 | 4.55 | 4.02 | 0.75 | 2.15 | 3.79 |

It can be seen from Table 1 that the highly stable modified Y-type molecular sieve provided in the present application has the following advantages: low sodium oxide content, relatively lower non-framework aluminum content at a relatively higher silica-alumina ratio, higher percentage of pore volume of secondary pores having a pore size of 2.0-100 nm to total pore volume, relatively higher B acid/L acid ratio (the ratio of total B acid content to total L acid content), relatively higher crystallinity when the molecular sieve has a relatively smaller lattice constant and a relatively higher rare earth content, and high thermal stability.

TABLE 2P

Aging test of the modified Y-type molecular sieves

| Example No. | Name of molecular sieve | Relative crystallinity of fresh molecular sieve sample (%) | Relative crystallinity of aged molecular sieve sample (%) (800° C./aged for 17 hours) | Relative crystallinity retention/% |
|---|---|---|---|---|
| Ex. 1P | SZ-1P | 70.4 | 40.37 | 57.34 |
| Ex. 2P | SZ-2P | 71.8 | 37.26 | 51.89 |
| Ex. 3P | SZ-3P | 75.4 | 44.16 | 58.57 |
| Comp. Ex. 1P | DZ-1P | 60.1 | 4.30 | 7.15 |
| Comp. Ex. 2P | DZ-2P | 59.5 | 5.90 | 9.92 |
| Comp. Ex. 3P | DZ-3P | 58.1 | 21.01 | 36.16 |

It can be seen from Table 2 that the modified Y-type molecular sieve provided in the present application shows a relatively higher relative crystallinity retention after being aged in a bare state under severe conditions at 800° C. for 17 hours, indicating that the modified Y-type molecular sieve provided in the present application has a higher hydrothermal stability.

TABLE 3P

Micro-activity of the catalytic cracking catalysts

| Example No. | Name of catalyst | MA (initial) (800° C./4 h) | MA (equilibrium) (800° C./ 17 h) | MA (equilibrium)/ MA (initial) |
|---|---|---|---|---|
| Ex. 4P | SC-1P | 85 | 74 | 87.06 |
| Ex. 5P | SC-2P | 87 | 72 | 82.76 |
| Ex. 6P | SC-3P | 84 | 71 | 84.52 |
| Comp. Ex. 4P | DC-1P | 41 | 18 | 43.90 |
| Comp. Ex. 5P | DC-2P | 52 | 29 | 55.77 |
| Comp. Ex. 6P | DC-3P | 80 | 59 | 73.75 |

TABLE 4P

Properties of feedstock oil used in the ACE evaluation

| Name | WuHan-mixed-III-2007 |
|---|---|
| Density (20° C.)/(g · cm$^{-3}$) | 0.9104 |
| Viscosity (80° C.)/(mm$^2$/s) | 19.24 |
| Viscosity (100° C.)/(mm$^2$/s) | 11.23 |
| Condensation point/° C. | 40 |
| Carbon residue/wt % | 3.11 |
| Saturated hydrocarbons/wt % | 62.3 |
| Aromatics/wt % | 22.7 |
| Colloid/wt % | 14.4 |
| Asphalt/wt % | 0.6 |
| Element mass fraction/% | |
| C | 86.9 |
| H | 12.63 |
| S | 0.61 |
| N | 0.2 |
| Distillation range (D1160)/° C. | |
| Initial boiling point | 267 |
| 5% | 318 |
| 10% | 339 |
| 30% | 407 |
| 50% | 451 |
| 70% | 494 |
| 81.5% | 540 |

TABLE 5P

Catalytic cracking performances of the catalytic cracking catalysts

| | Example No. | | | | | |
|---|---|---|---|---|---|---|
| | Ex. 7P | Ex. 8P | Ex. 9P | Comp. Ex. 7P | Comp. Ex. 8P | Comp. Ex. 9P |
| Name of catalyst | SC-1P | SC-2P | SC-3P | DC-1P | DC-2P | DC-3P |
| Name of molecular sieve | SZ-1P | SZ-2P | SZ-3P | DZ-1P | DZ-2P | DZ-3P |
| Catalyst-to-oil ratio | 5 | 5 | 5 | 9 | 8 | 5 |
| Product distribution/ wt % | | | | | | |
| Dry gas | 1.27 | 1.35 | 1.29 | 1.55 | 1.48 | 1.41 |
| Liquefied gas | 17.05 | 16.65 | 16.68 | 16.86 | 15.33 | 16.43 |
| Coke | 3.45 | 3.59 | 3.61 | 8.33 | 7.61 | 5.94 |
| Gasoline | 55.82 | 56.47 | 55.57 | 38.55 | 43.91 | 51.81 |
| Diesel oil | 15.98 | 15.93 | 16.27 | 20.17 | 19.25 | 16.46 |
| Heavy oils | 6.43 | 6.01 | 6.58 | 14.54 | 12.42 | 7.95 |
| Total | 100 | 100 | 100 | 100 | 100 | 100 |
| Conversion/ wt % | 77.59 | 78.06 | 77.15 | 65.29 | 68.33 | 75.59 |
| Coke selectivity/ wt % | 4.45 | 4.60 | 4.68 | 12.76 | 11.14 | 7.86 |
| Light oil yield/ wt % | 71.8 | 72.4 | 71.84 | 58.72 | 63.16 | 68.27 |
| Total liquid yield/wt % | 88.85 | 89.05 | 88.52 | 75.58 | 78.49 | 84.7 |

It can be seen from the results listed in Table 3P and Table 5P that the catalytic cracking catalyst prepared by using the molecular sieve provided in the present application as an active component shows a very high hydrothermal stability, a significantly lower coke selectivity, a significantly higher liquid yield, a significantly higher light oil yield, an improved gasoline yield, and a higher heavy oil conversion activity.

In the above description, the concept of the present application has been described with reference to the embodiments. However, it will be understood by those skilled in the art that various modifications and changes can be made without departing from the scope of the present invention defined in the appended claims. Accordingly, the description and drawings should be regarded as illustrative rather than limiting, and all such modifications and changes are covered by the present invention.

It is to be understood that some of the features described separately in a plurality of embodiments for the sake of clarity may also be provided as a combination in a single embodiment. Conversely, a plurality of different features that are described in a single embodiment for the sake of brevity may also be provided separately or in any subcombination in different embodiments.

The invention claimed is:

1. A modified Y-type molecular sieve, having a rare earth oxide content of about 4% to about 12% by weight, a phosphorus content of about 0% to about 10% by weight on the basis of $P_2O_5$, a sodium oxide content of no more than about 1.0% by weight, a total pore volume of about 0.36 mL/g to about 0.48 mL/g, a percentage of a pore volume of secondary pores having a pore size of 2-100 nm to the total pore volume of the modified Y-type molecular sieve of about 20% to about 40%, a lattice constant of about 2.440 nm to about 2.455 nm, a percentage of the non-framework aluminum content to the total aluminum content of the modified Y-type molecular sieve of no more than about 10%, a lattice collapse temperature of not lower than about 1060° C., and a ratio of Brønsted acid to Lewis acid in a total acid content of the modified Y-type molecular sieve of no less than about 3.5, as determined by pyridine adsorption infrared spectroscopy at 200° C., and wherein the modified Y-type molecular sieve has a framework structure of zeolite Y.

2. The modified Y-type molecular sieve according to claim 1, wherein the modified Y-type molecular sieve has a percentage of the pore volume of secondary pores having a pore size of 2-100 nm to the total pore volume of about 28% to about 38%.

3. The modified Y-type molecular sieve according to claim 1, wherein the modified Y-type molecular sieve has a percentage of the non-framework aluminum content to the total aluminum content of about 5% to about 9.5% by weight, and a framework silica-alumina ratio of about 7 to about 14 calculated on the basis of $SiO_2/Al_2O_3$ molar ratio.

4. The modified Y-type molecular sieve according to claim 1, wherein the modified Y-type molecular sieve has a lattice collapse temperature of about 1060° C. to about 1085° C.

5. The modified Y-type molecular sieve according to claim 1, wherein the ratio of Brønsted acid to Lewis acid in the total acid content of the modified Y-type molecular sieve is about 3.5 to about 6, as determined by pyridine adsorption infrared spectroscopy at 200° C.

6. The modified Y-type molecular sieve according to claim 1, wherein the modified Y-type molecular sieve has a relative crystallinity of about 70% to about 80%, and, after being aged at 800° C. under atmospheric pressure in a 100% steam atmosphere for 17 hours, the modified Y-type molecular sieve shows a relative crystallinity retention of about 38% or more.

7. The modified Y-type molecular sieve according to claim 1, wherein the modified Y-type molecular sieve has a rare earth oxide content of about 4.5% to about 10% by weight, a phosphorus content of about 0.1% to about 6% by weight on the basis of $P_2O_5$, a sodium oxide content of about 0.05% to about 0.3% by weight, a lattice constant of 2.442-2.451 nm, and a framework silica-alumina ratio of about 8.5-12.6 calculated on the basis of $SiO_2/Al_2O_3$ molar ratio.

8. The modified Y-type molecular sieve according to claim 1, wherein the modified Y-type molecular sieve has a rare earth oxide content of about 5.5% to about 10% by weight, a sodium oxide content of about 0.15% to about 0.3% by weight, a percentage of the pore volume of secondary pores having a pore size of 2-100 nm to the total pore volume of the modified Y-type molecular sieve of about 20-38%, a lattice constant of 2.442-2.453 nm, and a framework silica-alumina ratio of about 7.8-12.6 calculated on the basis of $SiO_2/Al_2O_3$ molar ratio.

9. The modified Y-type molecular sieve according to claim 1, wherein the percentage of the pore volume of secondary pores having a pore size of 8-100 nm to the total pore volume of secondary pores having a pore size of 2-100 nm of the modified Y-type molecular sieve is about 40-80%.

10. A method for the preparation of a modified Y-type molecular sieve according to claim 1, comprising the steps of:

(1) contacting a NaY molecular sieve with a rare earth salt solution for ion-exchange reaction to obtain a Y-type molecular sieve containing rare earth elements and having a reduced sodium oxide content;

(2) calcining the Y-type molecular sieve obtained in the step (1) at a temperature of about 350° C. to about 520° C. in an atmosphere containing about 30 vol % to about 90 vol % of steam for a time of about 4.5 hours to about 7 hours to obtain a Y-type molecular sieve having a reduced lattice constant;

(3) contacting and reacting the Y-type molecular sieve obtained in the step (2) with gaseous silicon tetrachloride at a weight ratio of $SiCl_4$ to the Y-type molecular sieve on a dry basis ranging from about 0.1:1 to about 0.7:1 and a reaction temperature of about 200° C. to 650° C. for a reaction time of about 10 minutes to about 5 hours to obtain a gas phase ultra-stabilized Y-type molecular sieve;

(4) contacting the ultra-stabilized Y-type molecular sieve obtained in the step (3) with an acid solution; and (5) optionally contacting the acid-treated Y-type molecular sieve obtained in the step (4) to with a phosphorus compound.

11. The method according to claim 10, wherein the Y-type molecular sieve obtained in the step (1) has a lattice constant of about 2.465-2.472 nm, and a sodium oxide content of no more than about 9.0% by weight.

12. The method according to claim 10, wherein, in the step (1), the ion-exchange reaction of the NaY molecular sieve with the rare earth solution is carried out under the following conditions: NaY molecular sieve:rare earth salt:$H_2O$ weight ratio of about 1:0.01-0.18:5-20, an ion-exchange temperature of about 15-95° C., and an ion-exchange time of about 30-120 minutes.

13. The method according to claim 10, wherein, in the step (2), the calcination temperature is about 380-480° C., the calcination atmosphere contains about 40-80 vol % steam, and the calcination time is about 5-6 hours.

14. The method according to claim 10, wherein the Y-type molecular sieve having a reduced lattice constant obtained in the step (2) has a lattice constant of about 2.450-2.462 nm, and a water content of no more than about 1% by weight.

15. The method according to claim 10, wherein the step (4) comprises first contacting with an inorganic acid having a medium or higher strength; and then contacting with an organic acid, wherein the contacting with the inorganic acid having a medium or higher strength is carried out under the following conditions: a weight ratio of the inorganic acid to the molecular sieve of about 0.01-0.05:1, a weight ratio of water to the molecular sieve of about 5-20:1, a contact time of about 60-120 minutes, and a contact temperature of about 90-98° C.; and the contacting with the organic acid is carried out under the following conditions: a weight ratio of the organic acid to the molecular sieve of about 0.02-0.10:1, a weight ratio of water to the molecular sieve of about 5-20:1, a contact time of about 60-120 minutes and a contact temperature of about 90-98° C.

16. The method according to claim 15, wherein the organic acid is one or more selected from the group consisting of oxalic acid, malonic acid, succinic acid, methyl succinic acid, malic acid, tartaric acid, citric acid, and salicylic acid, and the inorganic acid having a medium or higher strength is one or more selected from the group consisting of phosphoric acid, hydrochloric acid, nitric acid, and sulfuric acid.

17. The method according to claim 10, comprising carrying out the step (5) by contacting the acid-treated Y-type molecular sieve obtained in the step (4) with an exchange liquid containing a phosphorus compound to conduct an ion-exchange reaction at about 15-100° C. for about 10-100 minutes; wherein, in a mixture formed by the exchange liquid and the molecular sieve, a weight ratio of water to the acid-treated Y-type molecular sieve is about 2-5, a weight ratio of phosphorus (on the basis of $P_2O_5$) to the acid-treated Y-type molecular sieve is about 0.0005-0.10.

18. The method according to claim 10, wherein: the step (1) comprises filtering, washing, and optionally drying the NaY molecular sieve after the ion-exchange reaction to obtain the Y-type molecular sieve, wherein the Y-type molecular sieve has a normal lattice constant; in the step (2), the calcination temperature is about 350 to 480° C.

19. A catalytic cracking catalyst comprising the Y-type molecular sieve according to claim 1.

20. The catalytic cracking catalyst according to claim 19, comprising about 10% to about 50% by weight, on a dry basis, of the Y-type molecular sieve, about 10% to about 40% by weight, on the basis of alumina, of an alumina binder, and about 10% to about 80% by weight, on a dry basis, of clay.

* * * * *